US008725288B2

(12) United States Patent
Yeung et al.

(10) Patent No.: US 8,725,288 B2
(45) Date of Patent: May 13, 2014

(54) SYNTHESIS OF MAIL MANAGEMENT INFORMATION FROM PHYSICAL MAIL DATA

(75) Inventors: Yukee Yeung, Ottawa (CA); Imtiaz Fazal, Ottawa (CA); Shane Daniel, Ottawa (CA); James Reed, Ottawa (CA); Sam Zaid, Ottawa (CA)

(73) Assignee: Canada Post Corporation, Ottawa, Ontario (CA)

( * ) Notice: Subject to any disclaimer, the term of this patent is extended or adjusted under 35 U.S.C. 154(b) by 1175 days.

(21) Appl. No.: 12/607,430

(22) Filed: Oct. 28, 2009

(65) Prior Publication Data

US 2011/0098846 A1 Apr. 28, 2011

(51) Int. Cl.
*G06F 7/00* (2006.01)

(52) U.S. Cl.
USPC .......................................... 700/224; 209/584

(58) Field of Classification Search
USPC .................................. 700/223, 224; 209/584
See application file for complete search history.

(56) References Cited

U.S. PATENT DOCUMENTS

| | | | | |
|---|---|---|---|---|
| 5,754,671 | A | 5/1998 | Higgins et al. | |
| 6,269,171 | B1 | 7/2001 | Gozzo et al. | |
| 6,574,351 | B1 | 6/2003 | Miyano | |
| 6,945,458 | B1 | 9/2005 | Shah et al. | |
| 6,954,729 | B2 | 10/2005 | Lee et al. | |
| 8,046,416 | B2 * | 10/2011 | Biasi et al. | 709/206 |
| 2002/0153409 | A1 | 10/2002 | Yu | |
| 2003/0085162 | A1 | 5/2003 | Daniels, Jr. et al. | |
| 2003/0114955 | A1 | 6/2003 | Daniels, Jr. | |
| 2004/0042650 | A1 | 3/2004 | Ii et al. | |
| 2004/0133443 | A1 | 7/2004 | Payne et al. | |
| 2005/0132071 | A1 | 6/2005 | Pintsov | |
| 2005/0163340 | A1 | 7/2005 | Lindwurm et al. | |
| 2005/0180661 | A1 | 8/2005 | El Bernoussi et al. | |
| 2006/0058914 | A1 | 3/2006 | Dearing | |
| 2009/0271029 | A1 * | 10/2009 | Doutre | 700/224 |

FOREIGN PATENT DOCUMENTS

| | | |
|---|---|---|
| EP | 1 835 444 | 9/2007 |
| WO | WO 00/57258 A3 | 9/2000 |
| WO | WO 2008/047117 A3 | 4/2008 |

* cited by examiner

*Primary Examiner* — Ramya Burgess

(57) ABSTRACT

Any of various types of mail management information may be synthesized from data associated with physical mail items. For example, addresses, complete with addressee names, could be synthesized from data collected from physical mail items. Confidence information which indicates a measure of confidence that each synthesized address is a valid address could also be generated from the collected data. Intelligence functions may be provided to enhance address synthesis capabilities. More generally, input data for synthesis of mail management information could include data collected from physical mail items, other mail management information, or both. Features such as service delivery compliance management, network proficiency management, delivery route proficiency management, customer compliance management, a visibility service, address cleansing, delivery notification, addressee verification, synthesis of statistics, and/or synthesis of behavioral patterns could be implemented.

37 Claims, 10 Drawing Sheets

SYNTHESIS OF MAIL MANAGEMENT INFORMATION FROM PHYSICAL MAIL DATA

FIELD OF THE INVENTION

This invention relates generally to the field of physical mail handling and, in particular, to synthesis of mail management information using data collected from or otherwise associated with physical mail items.

BACKGROUND

A traditional mail delivery system involves physical sorting and sequencing of mixed mail, from collection of mail items until delivery to addresses printed on the items. To permit a machine to group and sequence mail items, addresses on the mail items must be interpretable to the level that permits correct sorting decisions. For delivery, the address on a mail item must be related to a delivery location, such as a post box or a location on a street. In both cases, up-to-date knowledge of addresses is required in order to correctly interpret and retrieve operational relationships.

In Canada, for example, there are over 11 million civic addresses in urban cities, plus over 3 million rural addresses which may only have personal names or business names associated with a route number and a township. Rural mail that has no urbanized addresses can only be sorted to the delivery route level. Beyond the route level, delivery is by addressee names based on personal knowledge of local delivery agents.

For many years, urban and rural addresses have been managed through bottom-up processes. The change management process is labor intensive, characterized by long latency, human errors, and significant costs to acquire and correct delivery addresses. Local delivery agents are relied upon to report and to visually validate changes. New addresses in newly developed areas are acquired through submissions by municipalities and real estate developers. After lengthy validation, changes are mapped onto business and operational attributes. A mapping process involves associating an address with data attributes. In Canada, an address would first be associated with a postal code which, if it is a new one, is added to mail processing sort plans, followed by association of the low level address with a delivery route number, a walk sequence number and time values, a mail box number and any special services such as redirection mail and hold mail that may also require association of individual names to addresses, etc. An address may be operationally "undeliverable" without a correct prior association. Address databases and operational directories of sort equipment are subsequently updated. Address changes are also acquired or cross validated with third party address databases. Data quality clearly depends on geographic coverage, completeness, currency, accuracy, and usefulness of the mapped-over business attributes.

Some mail sort equipment sorts to delivery routes by reading up to the street number in the destination address of each mail item to enable a sort decision. In Canada, the highly structured Canadian postal code of FSA LDU (Forward Sort Area Local Delivery Unit) also provides complete redundant information to permit sorting to delivery routes. Individual carriers subsequently use a sort case to manually order the pieces to line-of-route delivery sequence. Any addressing deviations, errors, and changes are handled by individual carriers based on personal knowledge and familiarity with their delivery areas.

Mechanical sequencing of mail to line-of-route delivery is also possible. Some systems sequence mail to outside street addresses only, for example. Other systems may also sequence inside unit numbers to further improve efficiency. However, the business process of address maintenance, data accuracy and error handling, attribute mapping, and change latency are non-trivial and are usually specific to the service environments. They become critical when human knowledge and in-situ decisions of local delivery carriers are replaced by machines.

To fully sequence mail, a machine needs to read and correctly interpret the last address attribute which, in the case of Canadian addresses, is apartment unit numbers in urban areas, personal names and business names in rural areas, as well as box numbers in certain delivery addresses. The present Canadian postal code does not provide sufficient redundant information to map onto a single dwelling unit. If the full mailing address is not also encoded in a barcode by a mailer, then there is no redundant information on a mail item to permit reliable optical reading and interpretation of the written address. Optically read addresses must first be parsed reliably to identify street name, street number, apartment unit number, box number, personal name, and business name. Because the presentation orders and formats of these low level attributes are inconsistent, a reference address directory is usually used to minimize uncertainties. Ideally, the reference directory should be a full set of attributes at any given time such that all valid live observations are always inclusively a subset of those attributes. Any shortcomings would increase parsing errors or delivery failures, as there is no other information to determine validity. Furthermore, in a deterministic sort system, a mail item is usually rejected from the line if an observed address has not been pre-mapped to a route or a sequencing order in a running sort plan.

Although mail is supposed to be delivered to a person or a business per address, in practice mail is delivered to a mail box or other destination where the person or the business is supposed to be located according to the address on a mail item. Addressee names, particularly personal names, are usually not known to the mail system, and for all practical purposes other than in the case of premium secure registered mail and redirected mail services for instance, names are not an operational attribute in urban delivery. This is not true in rural delivery where civic addresses might not exist. Personal names and business names are still the only way to differentiate delivery points. However, system complexity, scalability, and cost significantly increase where delivery service progresses from an address to an addressee, and ultimately to the addressed individual. In hybrid delivery services which are interactive and multi-media by nature, privacy protection and security require proper distinction and verifiable associations of addresses, addressee names, and the addressed individuals.

Mail sort plan and delivery route configurations are generally static, based on geographic features and delivery workload. Configuration changes are adjusted periodically when warranted by appreciable volumetric, demographic, or geographic changes. Because the change process is largely manual, cost, natural latency, and lack of reliable real-time data have confined change management to long term adjustments using volumetric averaging, timeline averaging, and geographic spatial averaging. Given the seasonal and cyclic nature of mail services, and the increasing traffic and volumetric gaps between residential homes and businesses, higher system efficiency requires higher proximity of system configurations to actual load demands in lieu of averaging that leverages workloads rather than efficiency.

For many years, delivery systems have been deterministic and addresses are treated as 100% accurate until proven otherwise. Increasingly, some business applications such as financial transactions, government services, and advertising campaigns desire prior knowledge of the quality of the addresses and occupancies before mailing for better mailing security and cost effectiveness management.

Conventional mail systems also typically collect only certain types of data from physical mail items to enable routing of those items, and store the collected data for only a relatively short amount of time. Actual usage of the collected data is thus significantly limited.

SUMMARY

According to one aspect of the invention, there is provided an apparatus that includes a data collector and an address synthesizer operatively coupled to the data collector. The data collector collects data from physical mail items, and the address synthesizer receives the data collected by the data collector, synthesizes addresses from the collected data, and generates confidence information from the collected data. The confidence information indicates a measure of confidence that each synthesized address is a valid address.

The synthesized addresses might include respective addressee names, in which case the confidence information indicates a measure of confidence that each synthesized address including an addressee name is a valid address.

In some embodiment, the apparatus also includes an interface, operatively coupled to the data collector, that enables communications with remote equipment. Where the remote equipment captures the data from the physical mail items, the data collector collects the data by receiving the data from the remote equipment through the interface.

The apparatus might include a parser, operatively coupled to the data collector, that parses the data from raw mail records that include data captured from the physical mail items. The data collector then collects the data by receiving the parsed data from the parser.

The address synthesizer may synthesize the addresses by building a representation of each address including address attributes in a hierarchical structure which delineates relationships between the address attributes. The confidence information may then include link strengths indicating associative strengths of pair-wise relationships between the address attributes in adjacent levels of the hierarchical structure. A combination of link strengths of links between a set of address attributes in a synthesized address provides the measure of confidence that the synthesized address is a valid address.

The link strengths are updated by the address synthesizer based on the link strengths following a previous collection of data, a time lapse since the previous collection, and any new occurrences of address attributes in subsequently collected data. The address synthesizer further retires a previously synthesized address or an address attribute associated with the address where the address attribute does not occur in subsequently collected data.

In some embodiments, the address attributes include addressee names, and the link strengths include respective measures of confidence of validity of the addressee names associated with the synthesized addresses.

The address synthesizer might also perform one or more of the following functions:

- analyzing occurrence position and syntax association to enhance parsing of inside unit numbers and box numbers from delivery addresses in the collected data;
- removing from the collected data random background noises created by one or more of random addressing errors and optical reading errors during collection of the data;
- removing from the collected data systemic noises created by invalid addressing and persistent optical reading biases;
- analyzing unit data structures of multi-unit buildings and supplementing erred or incomplete unit numbers in delivery addresses in the collected data;
- adjusting, based on the collected data, a synthesis rate and accuracy at which the addresses are synthesized;
- recognizing from the collected data growth of a previously single address into multiple addresses;
- recognizing from the collected data consolidation of previously multiple addresses into a single address;
- establishing from the collected data one or more of: volumetric mail patterns, sender mail traffic profiles, receiver mail traffic profiles, seasonal mail traffic patterns, and geographic mail traffic patterns;
- recognizing from the collected data addresses in different languages and establishing equivalency for the same addresses in the different languages;
- recognizing different equivalent city names in the collected data;
- recognizing different interchangeable street names in the collected data;
- differentiating business names and personal names associated with delivery addresses in the collected data;
- differentiating last names from first and middle names in personal names associated with delivery addresses in the collected data;
- establishing a most probable correct business name for a synthesized address from a set of variations in the collected data;
- establishing most probable correct personal names for a synthesized address from a set of variations in the collected data.

Where the data collector collects the data by receiving the data from mail sort equipment which captures the data as written on the physical mail items, and the address synthesizer may control the mail sort equipment by subsequently providing the synthesized addresses to the mail sort equipment. The mail sort equipment sorts subsequently received mail items using the synthesized addresses to support correct machine interpretation of delivery addresses on the subsequently received physical mail items.

The apparatus may also include a memory, operatively coupled to the address synthesizer, for storing the synthesized addresses and their associated confidence information.

In some embodiments, an interface is operatively coupled to the data collector and to the address synthesizer, and enables access to one or more of the collected data, the synthesized addresses, and the confidence information.

A pre-processor could be operatively coupled to the data collector. The pre-processor receives raw mail records including data captured from the physical mail items and provides pre-processed data from the raw mail records to the data collector as the data. The pre-processor may include one or more of: a record screening module that eliminates duplicate or spoiled raw mail records, a parser that parses the data from the raw mail records, and a record segregation module that segregates raw mail records that include urban delivery addressing data and raw mail records that include rural addressing data.

A mail handling system might include mail sort equipment that captures data from physical mail items, and an apparatus as described above. The data collector could then collect the data by receiving the data from the mail sort equipment.

Such a mail handling system might also include a synthesized address repository that receives the synthesized addresses and the associated confidence information from the address synthesizer. The synthesized address repository could include a memory for storing the synthesized delivery addresses and the associated confidence information, and a user interface, operatively coupled to the memory, that enables selection of addresses and confidence levels from the synthesized addresses stored in the memory for output.

A communication interface could be operatively coupled to the memory, to enable the synthesized addresses to be transmitted to the mail sort equipment. The mail sort equipment might then use the synthesized addresses to perform one or more of: sorting subsequently received mail items, verifying delivery addresses in subsequently received mail items, correcting delivery addresses in subsequently received mail items, and redirecting subsequently received incorrectly addressed mail items to correct addresses.

In a mail handling system, the data collector and the address synthesizer might form a first synthesis module. The mail handling system might also include a second synthesis module that receives input data including one or more of the collected data, the synthesized addresses, and the confidence information, and synthesizes mail management information from the received input data.

The synthesized mail management information characterizes traffic that includes the physical mail items, in some embodiments.

In the second synthesis module, a user interface could provide an indication of the synthesized mail management information.

The second synthesis module could synthesize the mail management information by one or more of: establishing volumetric distributions of the traffic, establishing geographic distributions of the traffic, mapping traffic distributions to network resources, determining traffic process flow time for a mail network, and determining a mail network for providing a given service flow time.

A related method is also provided, and involves collecting data from physical mail items, synthesizing addresses from the collected data, and generating confidence information from the collected data. The confidence information indicates a measure of confidence that each synthesized address is a valid address.

Where the synthesized addresses include respective addressee names, the confidence information could indicate a measure of confidence that each synthesized address including an addressee name is a valid address.

In some embodiments, collecting involves one or more of: capturing the data from the physical mail items and receiving data that is captured from the physical mail items.

The method might also include parsing the data from raw mail records that include data captured from the physical mail items, in which case collecting could entail receiving the parsed data.

The operation of synthesizing might involve building a representation of each address including address attributes in a hierarchical structure. The hierarchical structure delineates relationships between the address attributes. Where such a structure is employed, the confidence information may include link strengths indicating associative strengths of pairwise relationships between the address attributes in adjacent levels of the hierarchical structure, with a combination of link strengths of links between a set of address attributes in a synthesized address providing the measure of confidence that the synthesized address is a valid address.

These link strengths could be updated based on the link strengths following a previous collection of data, a time lapse since the previous collection, and any new occurrences of address attributes in subsequently collected data. The method might also involve retiring a previously synthesized address or an address attribute associated with the address where the address attribute does not occur in subsequently collected data.

Where the address attributes comprise addressee names, the link strengths could include respective measures of confidence of validity of the addressee names associated with the synthesized addresses.

Synthesizing addresses might involve one or more of:

- analyzing occurrence position and syntax association to enhance parsing of inside unit numbers and box numbers from delivery addresses in the collected data;
- removing from the collected data random background noises created by one or more of random addressing errors and optical reading errors during collection of the data;
- removing from the collected data systemic noises created by invalid addressing and persistent optical reading biases;
- analyzing unit data structures of multi-unit buildings and supplementing erred or incomplete unit numbers in delivery addresses in the collected data;
- adjusting, based on the collected data, a synthesis rate and accuracy at which the addresses are synthesized;
- recognizing from the collected data growth of a previously single address into multiple addresses;
- recognizing from the collected data consolidation of previously multiple addresses into a single address;
- establishing from the collected data one or more of: volumetric mail patterns, sender mail traffic profiles, receiver mail traffic profiles, seasonal mail traffic patterns, and geographic mail traffic patterns;
- recognizing from the collected data addresses in different languages and establishing equivalency for the same addresses in the different languages;
- recognizing different equivalent city names in the collected data;
- recognizing different interchangeable street names in the collected data;
- differentiating business names and personal names associated with delivery addresses in the collected data;
- differentiating last names from first and middle names in personal names associated with delivery addresses in the collected data;
- establishing a most probable correct business name for a synthesized address from a set of variations in the collected data;
- establishing most probable correct personal names for a synthesized address from a set of variations in the collected data.

In some embodiments, collecting involves receiving the data from mail sort equipment which captures the data from the physical mail items, and the method further includes controlling the mail sort equipment by subsequently providing the synthesized addresses to the mail sort equipment. The mail sort equipment then sorts subsequently received mail items using the synthesized addresses to support correct machine interpretation of delivery addresses on the subsequently received physical mail items.

The method might also involve providing access to one or more of the collected data, the synthesized addresses, and the confidence information.

Where raw mail records including data captured from the physical mail items are received, those raw mail records could be pre-processed to provide pre-processed data from the raw mail records as the collected data. The pre-processing might involve one or more of: eliminating duplicate or spoiled raw mail records, parsing the data from the raw mail records, and segregating raw mail records that include urban delivery address data and raw mail records that include rural address data.

In some embodiments, the method involves using the synthesized addresses to perform one or more of: verifying addresses in subsequently received mail items, correcting addresses in subsequently received mail items, and redirecting subsequently received incorrectly addressed mail items to correct addresses.

Mail management information could be synthesized from input data that include one or more of the collected data, the synthesized addresses, and the confidence information.

The synthesized mail management information might characterize traffic that includes the physical mail items, as noted above.

The method might also include providing an indication of the synthesized mail management information.

Synthesis of the mail management information might involve one or more of: establishing volumetric distributions of the traffic, establishing geographic distributions of the traffic, mapping traffic distributions to network resources, determining traffic process flow time for a mail network, and determining a mail network for providing a given service flow time.

According to a further aspect of the invention, an apparatus includes a communication interface, a user interface, and mail management information synthesizer, operatively coupled to the communication interface and to the user interface. The mail management information synthesizer receives through the communication interface input data that include one or more of data associated with physical mail items and mail management information synthesized by a further mail management information synthesizer, synthesizes additional mail management information from the received input data to characterize traffic comprising the physical mail items, and provides an indication of the synthesized additional mail management information through the user interface.

In some embodiments, the mail management information synthesizer synthesizes the additional mail management information by one or more of: establishing volumetric distributions of the traffic, establishing geographic distributions of the traffic, mapping traffic distributions to network resources, determining traffic process flow time for a mail network, and determining a mail network for providing a given source flow time.

The received input data could include data collected at scan points at a mail piece level and at a bulk level, in which case the mail management information synthesizer might synthesize the additional mail management information by tracking and monitoring mail transaction flow times between the scan points at the piece level and at the bulk level.

The additional mail management information could be synthesized by one or more of: determining sender names and return addresses from the received input data, alerting senders of physical mail items having undeliverable addresses, notifying addressees of the physical mail items ahead of delivery, enabling interactive scheduling with the addressees for delivery of the physical mail items, and providing an indication that physical mail items are to be intercepted for new delivery scheduling.

One or more of the following could be implemented by the mail management information synthesizer: service delivery compliance management, network proficiency management, delivery route proficiency management, customer compliance management, a visibility service, address cleansing, delivery notification, addressee verification, synthesis of statistical relationships, and synthesis of behavioural patterns.

A related method involves receiving input data including one or more of data associated with physical mail items and mail management information synthesized from the data associated with the physical mail items, synthesizing additional mail management information from the received input data to characterize traffic comprising the physical mail items, and providing an indication of the synthesized additional mail management information.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
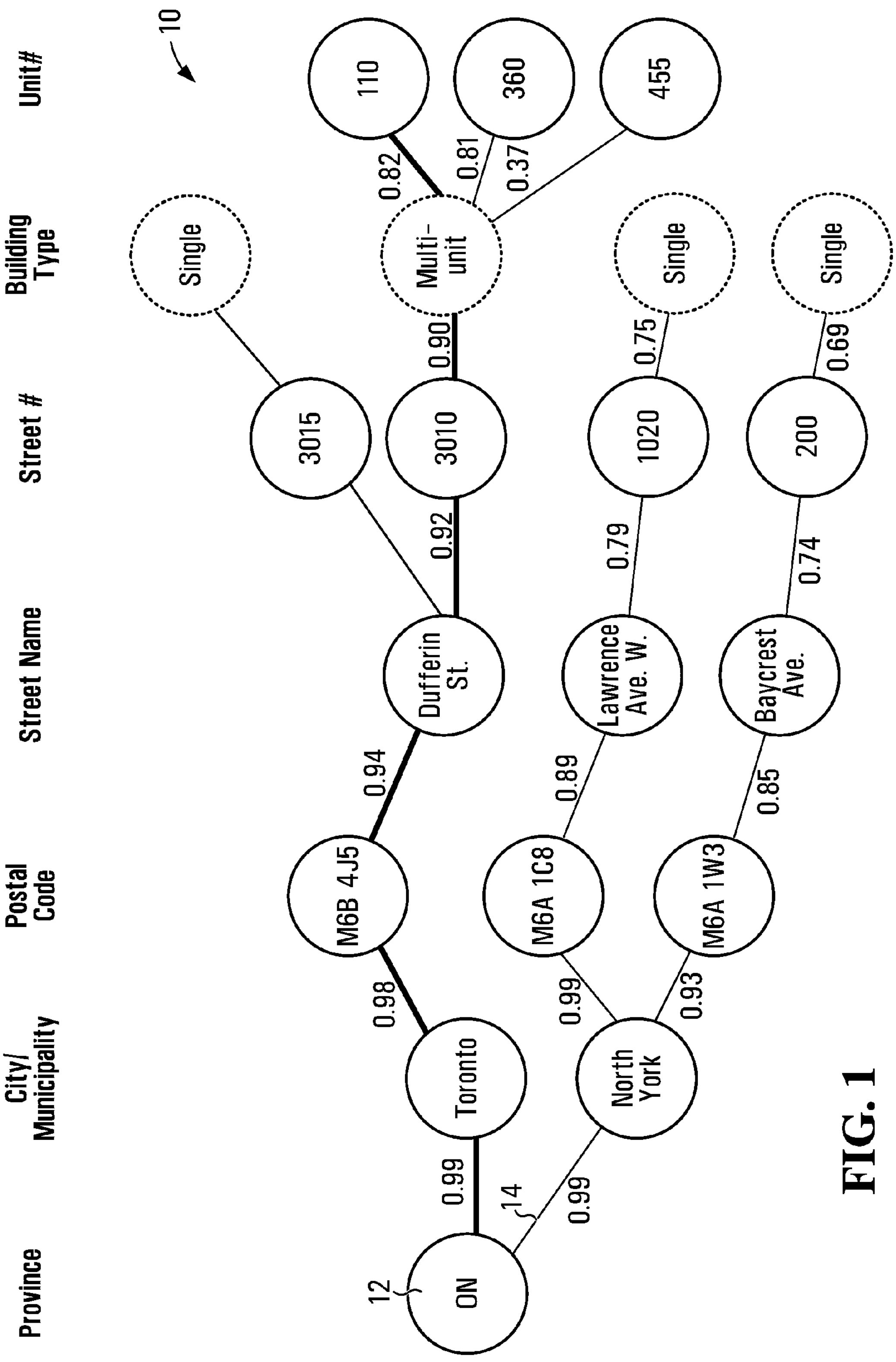
FIG. 1 is a block diagram representing an example neural model of synthesized urban addresses.

Embodiments of the present invention relate to synthesis of mail management information using data collected from physical mail items. Mailing addresses represent one example of mail management information that could be synthesized in accordance with the teachings provided herein, and address synthesis is disclosed in detail as an illustrative embodiment. Other types of mail management information might also or instead be synthesized.

Any of various types of data could be collected. For example, mailing information on the mail items could be collected as raw data. This could include, for example, one or more of:

addressing information that generally includes one or more addressee names and titles, and a delivery location such as a dwelling civic address, a code such as a postal code or a zip code, a mailbox number, a building name, and a business unit name;

return information that generally includes one or more sender names and titles, and a return location such as a dwelling civic address, a code such as a postal code or zip code, a mailbox number, a building name, and a business unit name;

delivery service payment information such as stamps, meter indicia and permit indicia that contain data in both text and barcode formats;

service information indicated by one or more service codes, graphic icons, or both for outbound delivery services such as prior notification, delivery confirmation, and addressee identity verification, and inbound returning services such as return-to-sender, secure content extraction or destruction, data extraction, data transformation, alerts, and notifications;

piece tracking information such as a pre-printed barcode label, a customer barcode, and a status query identifier issued online on-demand;

business information relevant to the services such as a batch shipment identifier, an inventory piece identifier, a purchase number, date and time, and a shipping location identifier;

one or more images of the presentation face of the mail item such as a letter envelope and a shipping label on parcels and oversized items.

The formats of collected data might include printed text, handwritten text, linear barcodes and 2-dimensional barcodes, approved graphic icons where applicable, and images. Identical data may also appear in one or more formats or locations on the same physical item.

Processing data might be assigned to or directly encoded onto a mail item by mail processing apparatus, and could also be collected. A Video Encoding System (VES) barcode for image processing, a sorting barcode to enable subsequent machine processing, and a record identifier for various data elements related to a mail item are examples of such processing data that could be collected directly from mail items or possibly through some other mechanism such as manual input or a separate data channel which enables this information to be received by an information synthesis system.

Another example of data that could be collected from a separate channel as opposed to directly from mail items is shipping order data from large volume mailers associated with the induction and delivery of physical mail and any other additional services. This might be in the form of a hardcopy shipping statement or an electronic shipping statement, for example. A shipping statement contains data such as mailer identification, billing account number, order date and time, service delivery date and time, induction locations, shipment volumes, tracking numeric, and additional services such as address verification and correction, data transformation and messaging, mail printing and insertion, and delivery and return provisions.

Network operating information associated with the processing and delivery of services, such as time and location tracking of individual mail items and event tracking of resource provisions and service provisions associated with a mail item, might be associated with a mail item and collected as raw data for a synthesis application or service. Delivery confirmation and failure to authenticate an addressed receiver are examples of network operating information.

Revenue protection data could also potentially be associated with the delivery of services. Volumetric counting data could be collected for compliance verification and/or billing purposes of large volume induction, for example. Postage stamp and meter indicia data might be useful for such purposes as verifying authenticity or sufficiency of delivery service payments for fraud detection. Associating such data with images of physical items enables preservation and subsequent retrieval of evidence.

In the example of an address synthesis and mail traffic characterization computing system according to an embodiment of the invention, such a system might involve automated ongoing extraction and collection of mail traffic data from mail sort equipment in mail processing plants, such as any or all of addresses, piece tracking identifiers, delivery service payment identifiers, mailer identifiers, volumes, dates, times, origins, and destinations, as well as special intelligence functions to digest captured mail data. These functions could include such functions as enhanced address parsing, noise control, synthesis of addresses and occupant names with individual measurable confidences, adaptive learning for regional differences, learning addresses in different languages, and/or management of synthesized addresses in a directory. The captured data and synthesized outputs can be used to provide delivery network information for use in improving service efficiency, which might involve such functions as mail traffic characterization, network load leveraging, address cleansing and online correction, and/or improved optical read and delivery success.

Addresses, which might but need not necessarily include occupant names, can thus be built or synthesized entirely from data that is captured or otherwise retrieved as written on physical mail pieces during mail processing, without the use of an existing address database and completely independent from any address directories used by the sort equipment to sort mail. Any correlated addresses and corrections as interpreted and provided by the sort equipment based on internal machine directories and intelligence design need not be used for address synthesis according to embodiments of the invention. However, an address synthesis system could be entirely tied to and continuously connected in real-time to the sort equipment for sourcing raw addressing data as optically captured from mail items. While address synthesis as disclosed herein does not require the use of an address database to build or synthesize addresses, the synthesized addresses can be used to provide ongoing automated feedback with minimal time latency to update other existing address databases and directories including those required by sort equipment, and to permit empirical characterization of mail traffic to maximize service efficiency, for example. Some potential advantages are consistency, assured quality and uniformity across the entire network.

Ongoing automated feedback can address challenges associated with the need for an address database that has full national coverage, completeness to include apartment and suite units as well as occupant names particularly in rural areas, and ongoing daily national updates, which is desirable for correct sorting, sequencing, and secure delivery of physical mail. Confidences associated with synthesized addresses can be used, for example, to provide a probability measure of validity on any given single dwelling address, which in turn permits mail system applications or services to determine usage risks. Currently, such applications or services might have no measurable quality knowledge on every given address to quantify risks and cost effectiveness. Commercial address databases generally provide only a statistical expectation based on group performances over some time lapse rather than an actual up-to-date measurement on any given address.

Collected data and/or synthesized address outputs could also be used for other purposes. For example, the same collected data that is used for address synthesis, or at least a subset thereof, could also be used to synthesize other types of mail management information. More generally, a mail management information synthesis application or service could use at least some of the same collected data, and/or possibly even the synthesized outputs of, one or more other synthesis applications or services.

These and other features of embodiments of the invention are described in further detail below.

FIG. 1 is a block diagram representing an example neural model of synthesized urban addresses. A neural network is considered an appropriate building technology to build a learning application. The example neural model 10 illustrates the rudimentary composition of urban Canadian addresses and the new address synthesis concept which, according to an embodiment of the invention, is used to synthesize them. Each node 12 represents an attribute of a delivery address. The longest linear path that links a series of nodes together represents an address. The hierarchy of nodes is in the order of the implicit country name Canada, which is generally not shown in domestic mail, followed by province, city or municipality, postal code, street name, street number, building type which is an internal logical node as opposed to information that would be entered on a physical mail item, and apartment unit number or box number. Physical mail items also often include an addressee name. In the case of urban addresses, however, addressee names could be muted in order to protect privacy.

Links 14 between nodes are also shown in FIG. 1. The value shown for a link between two nodes represents the strength of the pair-wise relationship. Link strength represents a measure of the validity of associating a lower node to its upper node(s) in the hierarchy. The combination of all link strengths on a full linear path in an address is the path strength. The path strength represents a possible form of a confidence measure or probability that a synthesized address is actually valid.

Figure 2:
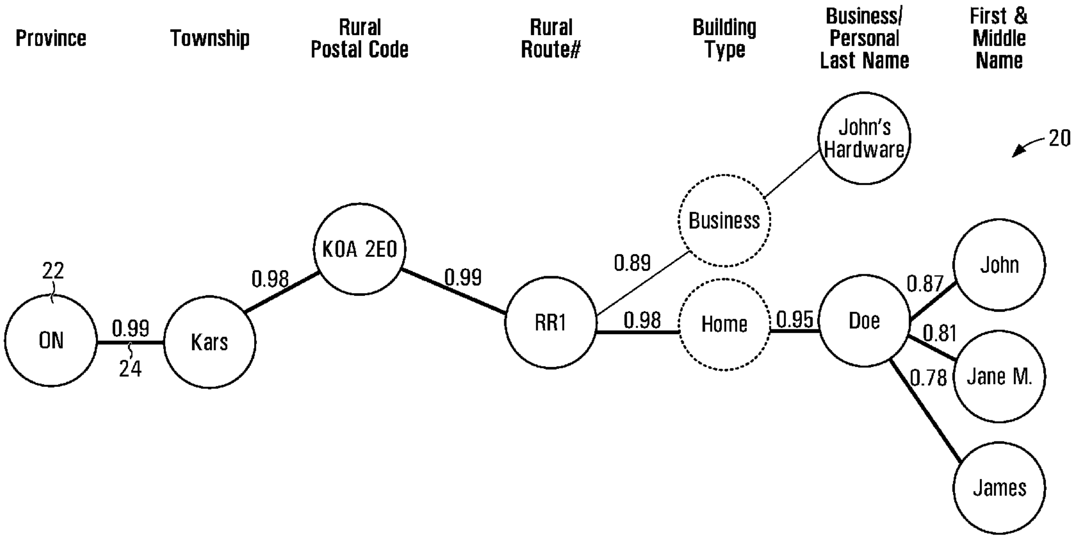
FIG. 2 is a block diagram representing another example neural model, for synthesized rural addresses.

FIG. 2 is a block diagram representing another example neural model 20, for synthesized rural addresses, and illustrates the rudimentary composition of rural Canadian addresses. Unlike urban addresses, the hierarchy of nodes 22 in the example neural model 20 is in the order of the implicit country name Canada (not shown), followed by province, township, rural postal code, a rural delivery route number assigned as part of a rural address, building type which in this example is an internal node to identify a business or a residence, and addressee name. A similar probabilistic approach as used for urban addresses may be used to synthesize rural addresses and measure probabilities of validity, illustratively link strengths for links such as 24. Additional intelligence functions may be used to differentiate business names from personal names, and/or to synthesize the most probable business names or personal names.

Where the example hierarchical neural models 10, 20 are to be used, every delivery address that is successfully read from a physical mail item is parsed into its rudimentary composition for subsequent processing. Hence, every empirically observed mail delivery address will either grow a new path, extend an existing path, or add strength to links on an existing path. "Upper" links in the hierarchy, such as at the street name level, the postal code level, and above in the example neural model 10 or at the rural route number level or above in the example neural model 20, would be expected to mature rapidly as there are more address records to strengthen the pair-wise relationships. Conversely, it might take longer for lower links in the hierarchy to mature because of lower hit densities in observed delivery addresses. Regardless of the actual validity in delivery addresses used by mailers, those addresses as observed on physical mail items are captured "in situ". Address validity can be subsequently determined in accordance with an acceptable probability threshold, for example. Some embodiments of the present invention thus use a new probabilistic and measurable approach to artificially create addresses based on rudimentary addressing components. Artificial address creation refers to the full address entity (i.e., a complete address) being synthesized from data components of other address entities, including its own, in a continuous process. This is a fundamental departure from conventional techniques, which treat addresses as discrete full entities.

It should be appreciated that embodiments of the present invention are not confined to Canadian addresses. The apparatus and techniques disclosed herein may be applied equally well to geographic based physical addresses of other countries, regardless of languages.

It should also be appreciated that an address entered on a physical mail item, and similarly a synthesized address, may include any or all of the attributes shown in the example models 10, 20 with the exception of the building type internal logical node, or a subset thereof. For example, a synthesized address might or might not include an occupant business or personal name.

Figure 3:
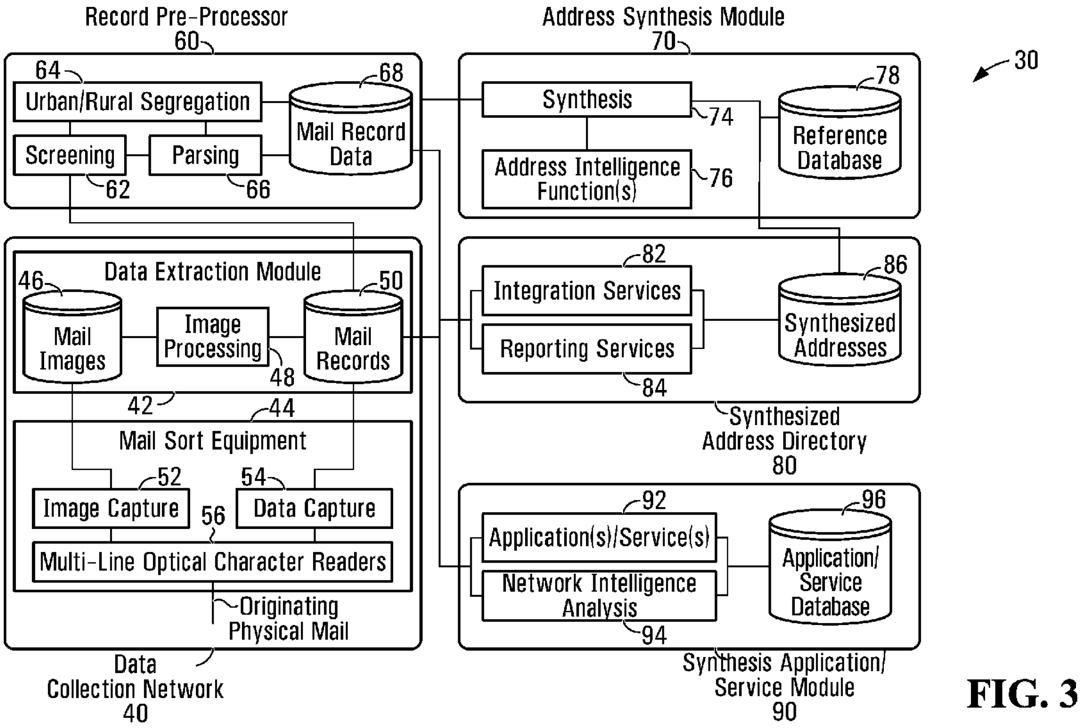
FIG. 3 is a block diagram illustrating examples of a system concept, apparatus, and functions.

FIG. 3 is a block diagram illustrating examples of a system concept, apparatus, and functions that are used in some embodiments to provide address synthesis and possibly other functions. The example system 30 has four basic functional modules, including a data collection network 40, a record pre-processor 60, an address synthesis module 70, and a synthesized address repository or directory 80. A synthesis application/service module 90 is also shown as an example of a further entity, in the form of another mail management information synthesis module, that might use synthesized addresses and/or collected data from which addresses are synthesized, or otherwise interact with a data collection infrastructure and/or an address synthesis system. A synthesis application/service module 90 might obtain collected raw data from the data extraction module 42 and/or the record pre-processor 60, and synthesize mail management information, as described in further detail below.

The data collection network 40 includes a data extraction module 42 and mail sort equipment 44, which may actually include one or more installations of such equipment. The data extraction module 42 includes respective data stores 46, 50 for storing collected data in the form of mail images and mail records, and also supports image processing 48 to extract data from captured images and/or to include captured images of physical mail items in mail records. The mail sort equipment 44 includes one or more MLOCRs (Multi-line Optical Character Readers) 56, and supports an image capture function 52 and a data capture function 54. The image capture function 52 might capture images of mail items or parts of such items such as barcodes described below, whereas the data capture function 54 captures data in the form of OCR data such as delivery addresses from mail items as they are processed by the sort equipment 44.

In the record pre-processor 60, functions of screening 62, urban/rural segregation 64, and parsing 66 are supported. A data store 68 for storing pre-processed mail record data is also provided.

The address synthesis module 70 supports an address synthesis function 74, as well as one or more address intelligence functions 76 which may be involved in address synthesis.

Figure 4:
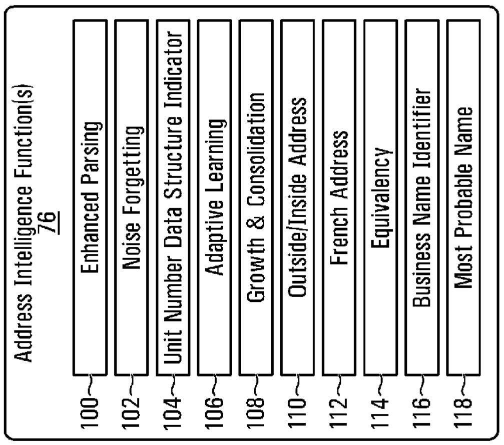
FIG. 4 is a block diagram illustrating example address intelligence functions.

Examples of address intelligence functions 76 are shown in FIG. 4 and described in detail below. The data store 78 stores a reference database for use in performing any or all of the address synthesis and intelligence functions 74, 76.

Integration services 82, reporting services 84, and a data store 86 for storing synthesized addresses are provided in the synthesized address directory 80.

Any of various applications and/or services 92 may be provided by the synthesis application/service module 90. Network intelligence analysis 94 is shown as one example of such an application or service. A data store 96 for storing a database including data for use by the application(s) and/or service(s) provided in the synthesis application/service module 90 is also shown.

FIG. 3 is intended solely for illustrative purposes, and thus the present invention is in no way limited to the example system 30 or the particular example embodiments explicitly shown in the other drawings and described herein.

For example, although the mail sort equipment 44 in the example system 30 includes MLOCRs 56, this should not be taken as an implication that embodiments of the present invention rely on any particular type of mail handling equipment. Different mail authorities or other delivery service providers such as courier companies might employ different types of mail processing equipment. For instance, separate parcel mail and small package mail sorting equipment could be used. Different mechanized equipment could be used to sort (i) oversized lettermail including magazines, (ii) bundles and packets, (iii) parcels, (iv) containers, (v) non-conveyables, and (vi) bags. Non-conveyables might include irregular shapes and odd sizes that cannot be mechanically sorted by regular mail sorting equipment. Materials handling equipment such as fork lifts could be used for non-conveyables, and data could still be captured manually such as by hand scanning, or automatically by using RFID (Radio Frequency Identification) tags for instance.

FIG. 3 also does not show typical system components such as system administrative functions, security and privacy protection functions, user setup and run execution functions, general reporting services, input and output devices, and backup systems, which might be provided in a system in which or in conjunction with which embodiments of the invention could be implemented.

More generally, other embodiments may include further, fewer, or different components which are interconnected in a similar or different manner than shown.

Many of the modules and functions shown in FIG. 3 could potentially be implemented in any of various ways, including in hardware, firmware, components which execute software, or some combination thereof. Electronic devices that may be suitable for implementations using software include, among others, microprocessors, microcontrollers, PLDs (Programmable Logic Devices), FPGAs (Field Programmable Gate Arrays), and ASICs (Application Specific Integrated Circuits), for example. Those skilled in the art will be familiar with at least some of the components of the example system 30, such as the MLOCRs 56.

Each of the data stores 46, 50, 68, 78, 86, 96 in the example system 30 may be implemented using one more memory devices, which may include solid state memory devices and/or memory devices that use movable or even removable storage media. A single data store could potentially include multiple memory devices of different types. Multiple data stores could also or instead be provided using the same memory device(s). For example, the same physical memory device(s) could be used to store the reference database 78 and the synthesized addresses 86, even though they are shown separately and within different functional modules in the example system 30, since the address synthesis module 70 interacts with both of these data stores. The synthesized address database 86 could then be part of the address synthesis module 70 but accessible to the integration and reporting services 82, 84.

Regarding interconnections between components, the nature of each interconnection may be dependent, to at least some extent, upon how the interconnected components are implemented. For example, components that are implemented in one or more processing elements that execute software to provide certain functions may be operatively coupled together indirectly, through access to the same registers or memory areas during software execution. Thus, the interconnections shown in the drawings and references herein to interconnected or coupled components should not in any way be taken as an indication of a direct physical connection.

In operation, the data collection network 40 collects relevant data from every mail piece processed by the mail sort equipment 44. Although only one piece of mail sort equipment 44 is explicitly shown in FIG. 3, in one embodiment the other main modules 60, 70, 80, 90 of the example system 30 interact with multiple installations of mail sort equipment, illustratively equipment in mail processing plants across Canada. The image capture function 52 captures one or more images of each mail item, and the data capture function 54 captures data such as delivery address data and possibly other data as well, through the MLOCRs 56. Captured images are stored in the mail images store 46 and processed at 48 for inclusion of the images, portions of the images, and/or data that is extracted from the images in mail records. A mail record is created for every mail item and stored in the mail records store 50.

Figure 5:
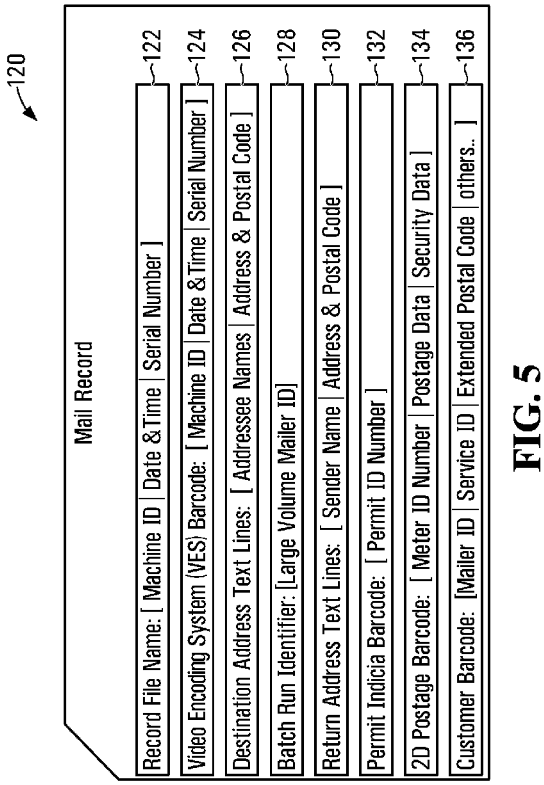
FIG. 5 is a block diagram illustrating data contents of an example mail record.

FIG. 5 is a block diagram illustrating data contents of an example mail record, which includes data that is captured from live mail items by the data capture function 54 and the MLOCRs 56. The example mail record 120 contains all the text lines 126 in the destination address block as detected by an MLOCR 56 and a unique Video Encoding System (VES) barcode 124, which is automatically encoded by an MLOCR on every mail piece and which also serves as the record file name 122 in the example shown. The data elements 122, 124 have the same data content, which is the VES barcode content. The data element 122 serves as a unique record file name and mail piece tracking ID, and the data element 124 serves as a data string in the record 120 to be parsed to retrieve record creation location and time. The same VES barcode data content appears twice, at 122, 124 in the example record 120, for clarity and may also ease implementation, but are sourced from the same VES barcode for different purposes.

More specifically, the VES barcode 124 is a structured barcode that contains a Machine ID assigned to the mail sort equipment 44, the date and time of encoding, and a serial number which together make a unique barcode identifier of every mail piece. The Machine ID provides a location of the source of input records. In one embodiment, records are extracted continuously from production statistics of every MLOCR 56 by one or more data extraction modules 42 and transported in a secure manner, illustratively via an internal communication network of a postal authority or other delivery service provider, to a central national processing location at which at least the record pre-processor 60, the address synthesis module 70, and the synthesized address directory 80 are implemented. Data extraction could potentially also be centralized, or implemented in a distributed manner, at each installation of mail sort equipment 44. The transfer of mail records from the store 50 to the record pre-processor 60 could be initiated periodically, at the same time every day for instance, or in response to requests or commands from the pre-processor. Depending on actual mail volumes, millions of records from mail-in-process could be created and collected every day on a continuous basis.

Additional data may also be included in a mail record, including any or all of a mailer identifier 128 if detected or entered by a machine operator in a pure batch run of commercial Large Volume Mailer mail, return address text lines 130 if detected by the MLOCR 56, a Permit Mail indicia identifier barcode 132 if detected, a 2D meter delivery service payment indicia barcode 134 if detected, and a customer encoded barcode 136 if detected.

The record pre-processor 60 processes the mail records prior to address synthesis. The screening function 62 might eliminate duplicate records that have identical record file names 122, records that have no VES barcode 124 since their originating "freshness" cannot be assured due to the absence of encoding date and time information, records that have no address text lines 126, and any other records that are clearly spoiled or identifiable as test mail. The data record parsing function 66 receives screened records, and may involve such tasks as parsing out the content of the VES barcode 124 for date and time, looking up the geographic location of the Machine ID included in the VES barcode, and/or parsing the address text lines 126 according to the address attribute hierarchy. In some embodiments, the urban/rural address segregation function 64 segregates urban addresses from rural addresses and adds treatments to comply with security and privacy protection requirements, for instance. The parsing function 66, the urban/rural address segregation function 64, or possibly another function or component, depending on the implementation, arranges the parsed and possibly segregated and cleansed record data into a database format in the store 68 to be subsequently digested by the address synthesis module 70.

The address synthesis module 70 provides an address synthesis function 74 and one or more address intelligence functions 76, examples of which are illustrated in FIG. 4 and described in detail below, to "digest" input mail record data from the mail record data store 68 and generate synthesized addresses with probability measures. Where the address structure follows a geographic hierarchy, as in the example neural models 10, 20 (FIGS. 1 and 2), record data can be safely distributed to parallel computing units based on traffic volumes and geography to shorten digestion time. For example, data from all records associated with mail items that are destined to a particular area such as a province or state could be allocated to one computing unit. To improve system effectiveness, record data could also or instead be distributed based on special characteristics. Data from all records that include a rural address, for instance, could go to a special computing unit for synthesis of names. A skilled person would recognize that mail record data could potentially be segregated, re-processed, cross-mapped to other attributes, and/or analyzed for behavioral intelligences.

In one embodiment, the raw mail records are automatically stored by default until deletion. Analysis for behavioural intelligences might include data mining of the raw and/or pre-processed records to extract business and operational intelligences. For example, a volumetric From-To mail flow matrix could be established in conjunction with a network routing roadmap using machine IDs (From), destinations (To), and volume counts. Any of various distribution stages could be used in this type of matrix, such as destination postal, zip, or other address code, final delivery routes, route sort machine plans, downstream plants, and/or transportation links. Collected data, synthesized addresses, or both could thus be used to better manage network resources and capacity online and off-line. Destination postal codes in Canadian addresses, for instance, could be volumetrically cross-mapped to specific routes to better manage route loading for improved service performance, avoidance of over-time and effective resource scheduling. Specific mailer IDs such as Permit ID Number at 132 or Meter ID Number at 134 could be cross-mapped to destination codes such as postal codes or zip codes and date/time to better understand the service needs and mailing behaviours of the mailers. Another option would be to cross-map addressee names to other data attributes such as mailer ID and machine ID and volume counts to understand the receiving profiles and the service needs of the receivers. Addresses could also or instead be cross-mapped to other external sources to develop various profiles of addresses, streamline advertising efforts, and provide risk assessments for financial transactions, for example.

Other types of mail record data segregation, processing, or cross-mapping, to synthesize other types of mail management information, may be or become apparent to those skilled in the art.

Additional data that might be used during address synthesis is stored in the reference database 78. This data might include, for example, the city/municipality equivalencies, street name equivalencies, and/or language equivalencies described below. The reference database 78 may also store a "working" version of a synthesized address database. As noted below, addresses in the synthesized address data store 86 may be truncated to include only synthesized addresses having associated validity confidence values of greater than 90%. A working copy of a complete synthesized address database in the data store 78 would provide the synthesis function 74 with access to all previously synthesized addresses.

Regarding the actual synthesis of addresses and associated confidence information, an example of a basic synthesis process is described below. It should be appreciated, however, that this example is intended solely for the purposes of illustration. Embodiments of the invention are not in any way limited to the specific example described below.

In one embodiment, sigmoid functions are used to measure the strength of an associative link between two nodes in a neural network based on a number of times the link is excited. A link may be weighted by more than one sigmoid function, each appropriately used to measure an indicator. For example, a mailer ID may be an indicator of a certified mailer with known addressing quality and therefore deserves higher weighting for the purposes of determining confidence information. The weights from different sigmoid functions may be considered in combination such that all appropriate indicators are considered in computing a final strength or "score" on a link.

Numeric values of coefficients in mathematical functions employed during address synthesis are developed experimentally in some embodiments, in order to establish the optimal learning mode according to the specificities of the input addressing data and the desirable performances and output quality. Statistical experiments with access to known quality address databases and on-site visual verification resources, for example, may be used to benchmark performances and achieve desirable results for a given business environment.

A link between nodes carries an associative score, also referred to herein as a link strength, based on the quantity and quality of the input counts which are indicative of a number of times the address attributes corresponding to the linked nodes are observed together. When an update is run with fresh mail records, the previous score on the link in the last run serves as a baseline. In some embodiments, the baseline is adjusted for time lapse since the last run using a forgetting algorithm. The adjustment represents a natural erosion of confidence due to time lapse. Different erosion rates can be used to account for different characteristics in geographic location and address type in addition to time lapse, for example residential suburban areas versus urban commercial areas. The erosions might also or instead lead to a decline in a score in a non-linear way with respect to the level of the prior score. Generally, once the score has eroded past a certain threshold, the decline rate could be much faster. After the adjustment, new incremental scores from the fresh counts, if any, are added to the adjusted baseline to form a new baseline. The link strengths are summed to the path strength and normalized to create a confidence on the temporal address. Other intelligence algorithms, as well as limitations, overriding checks, and/or business rules created for the specific application environment might also or instead be used to adjust baselines. For example, an overriding check could be an imported list of known valid addresses regardless of mail traffic volumes such as vacant addresses or business addresses that have separate mailing addresses. In this case erosion on the listed addresses could be suppressed.

Learning Algorithm Function Types

Figure 6:
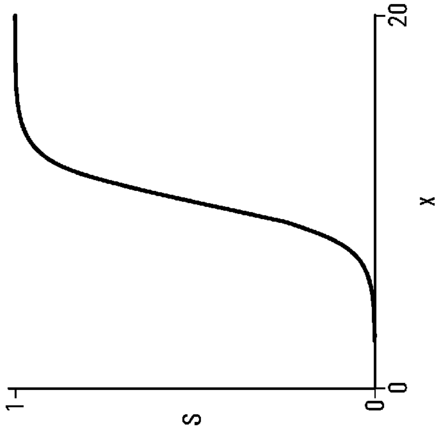
FIG. 6 is a plot showing an example of a sigmoid function.

In one embodiment, the learning algorithm for link strengths has a sigmoid function type. This is an S-shaped function as shown in FIG. 6, in which s is the indicator score and x is the number of instances the indicator was detected. A strong indicator score signifies that the indicator, which in the case of a link in an address neural network is an address attribute appearing together with a particular address attribute in the next higher level of an address hierarchy, was detected many times, while the converse is true for a low indicator score. Functions of the sigmoid type are often used in neural networks as they are continuous, differentiable everywhere, rotationally symmetric, and asymptotically approach saturation values.

This function has properties that may be desirable for a learning algorithm based on certain indicators. Here the indicator score between two nodes increases slightly as the indicator relating these nodes starts being detected. Since the initial increase is only slight, this will help prevent false node associations, due to addressing and/or OCR errors for instance, from becoming too strong. As the indicator is continued to be observed for the node association, its score begins to increase rapidly and then tapers off to a saturation value. Some different functions which are of this Sigmoid type are given in Eq. (1) to Eq. (3) below.

$$s = \frac{d}{1 + e^{-cx+b}} + a \qquad \text{Eq. (1)}$$

$$s = d\tanh(cx + b) + a \qquad \text{Eq. (2)}$$

$$s = d\frac{cx + b}{\sqrt{1 + (cx + b)^2}} + a \qquad \text{Eq. (3)}$$

In these equation a, b, c, and d are constants that allow the function to be shifted, stretched, or compressed. The constant a shifts the function vertically and the constant b shifts the function horizontally. The constant c stretches the function horizontally if c<0, and compresses horizontally if c>0. In a similar fashion, the constant d stretches or compresses the function vertically. These constants can be used as tuning parameters to determine the shape of the curve for each indicator.

Figure 7:
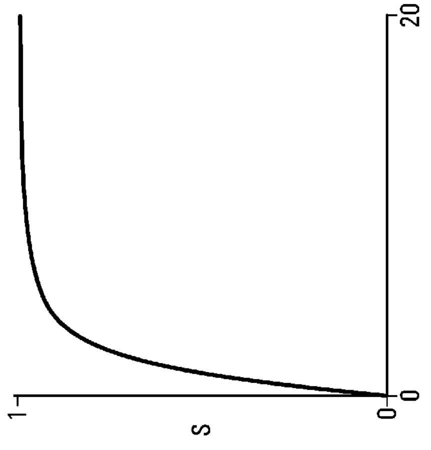
FIG. 7 is a plot showing an example of a half-sigmoid function.

A sigmoid function might be useful, for example, for a learning algorithm associated with a Mail Volume indicator, to generate confidence information based on the number of times address attributes corresponding to linked nodes are observed in live mail items. Some other indicators, such as High Quality Sender, might have a large impact on node connections from the first detection. This could be represented, for example, by a half-sigmoid by translating the point of rotational symmetry of the sigmoid to the point of origin, as is shown in FIG. 7.

With these functions, individual learning curves for each of the indicators to determine the set of indicator scores between nodes, based on Eq. (1)-Eq. (3), can be deduced. The scores due to the individual indicators can then be summed to determine the overall indicator score, $s_o$, for a node pair. There are different ways in which this can be realized. Linearly independent and codependent summation schemes are presented below as illustrative and non-limiting examples.

Linearly Independent Summation of Individual Indicator Scores

One relatively straightforward score summation scheme is to sum the scores linearly as given in Eq. (4).

$$s_o = \alpha_1 s_1 + \alpha_2 s_2 + \ldots + \alpha_n s_n \qquad \text{Eq. (4)}$$

where, $$\alpha_1 + \alpha_2 + \ldots + \alpha_n = 1.$$

Here $s_n$, represents the individual indicator scores and $\alpha_n$ is a constant which represents the weight of each indicator. Potential advantages of this method include its simplicity, which allows the weights of the different indicators to be easily observed and tuned, as well as the ease with which new indicators can be added or removed. In this scheme, however, if an indicator is not observed for a node pair, its score will saturate at a certain level <1 no matter how often other indicators are observed.

This overall indicator strength for a node pair can be translated into a synaptic link strength with the following equation, $$w_{i+1} = w_i + \eta(s_o - w_i). \qquad \text{Eq. (5)}$$

Here, $w_{i+1}$ is the new link strength, $w_i$ is the previous link strength, and $\eta$ is a dampening parameter. This dampening parameter is introduced as another tuning element to help dampen oscillations if necessary. As will be apparent, if $\eta=1$ then $w_{i+1}=s_o$.

Codependent Summation of Individual Indicator Scores

According to another scheme for determining the overall indicator score, $s_o$, all of the individual indicator scores are codependent and equivalent to the overall indicator score. Here, for example, if the individual indicator score for Mail Volume is increased, then the individual indicator scores for High Quality Sender and all other indicators will increase by the same amount. Under this method, all of the indicator scores on all of the indicator curves for a given node pair will be identical.

Figure 8:
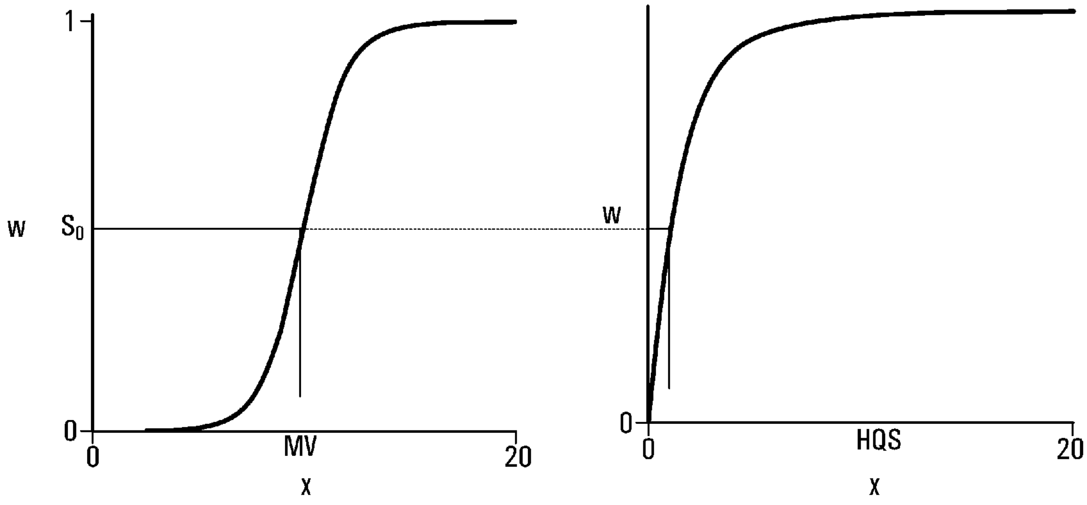
FIG. 8 includes plots illustrating a codependent summation scheme for a learning algorithm.

An example of such a codependent summation scheme is shown in FIG. 8, in which example Mail Volume (MV) and High Quality Sender (HQS) learning curves are given. In FIG. 8, the position in terms of total indicator score on these two curves is identical ($s_o$ in this example). When another indicator hit is observed, the position on that particular indicator curve is increased by 1 along the x-axis, and the positions on all indicator curves for that node pair, which as noted above are identical, are also adjusted appropriately.

One possible advantage of this scheme for combining the indicator learning functions is that it is still possible for a node pair to reach a saturation value close to 1 even if some indicators are not detected. The main potential drawback is that it will likely be more computationally intensive as the inverse of the learning functions would be calculated for each iteration. The order in which detected indicator hits are processed could also be of importance since a different order might produce a different result.

Even in the codependent scheme, each indicator still has its own function. When that indicator (Indicator 1) hits for a connection, the indicator score for that connection is adjusted according to this function. If a different indicator (Indicator 2) subsequently hits for the same connection, then the indicator score for Indicator 2 is adjusted according to its function. To realize this, the inverse function of Indicator 2 is calculated. If Indicator 2 hits before Indicator 1, then the final score result might not necessarily be the same.

For example, suppose that Indicator 1 is High Quality Sender and has a learning function given by Whqs(PMVhqs), and that Indicator 2 is Mail Volume and has a learning function given by Wmv(PMVmv). Here, PMV stands for Pseudo Mail Volume and represents the amount of mail needed to hit that indicator (and only that indicator) to produce a certain score. Further suppose that if the High Quality Sender indicator hits first, then the indicator score is calculated at 0.3 according to Whqs. If the Mail Volume indicator hits next, then a base value of PMVmv is first calculated for the codependent score of 0.3, by inverting the function Wmv(PMVmv). This might be greater than 1, as more observances of regular mail are needed to equal a High Quality Sender. For the purposes of illustration, assume that the base value of PMVmv=1.5 in this example. The calculated base value will then be increased by 1 to account for the new observation (PMVmv=2.5), and the new indicator score will be calculated using Wmv(2.5). If the Mail Volume indicator hits before the High Quality Sender indicator, then a different final result could be produced under this codependent scheme.

To determine the overall weighting between node pairs, Eq. (5) can be again applied to dampen oscillations.

Expressing Sigmoid Functions Recursively

Although Eq. (1)-Eq. (3) provide examples of one possible function type for a learning algorithm, they may add computational complexity to the system given the number of node pairs that may appear in an address system and the calculation of the inverses of the functions with the inclusion of the forgetting factor. To alleviate this complexity, the sigmoid function can be expressed as a recursive function as given in Eq. (6).

$$s(t+\Delta t)=s(t)+r\cdot s(t)\cdot(1-{}^{s(t)}/k), \qquad \text{Eq. (6)}$$

Figure 9:
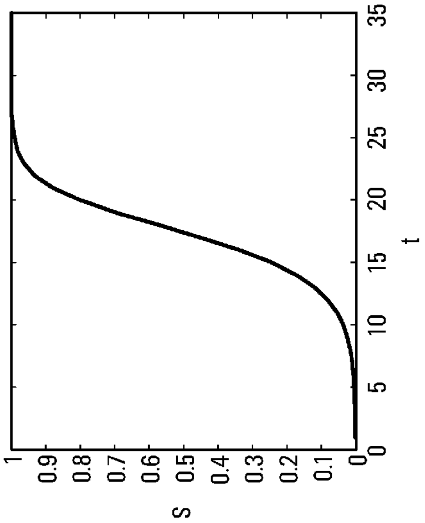
FIG. 9 is a plot showing an example of a recursive sigmoid function.
Figure 10:
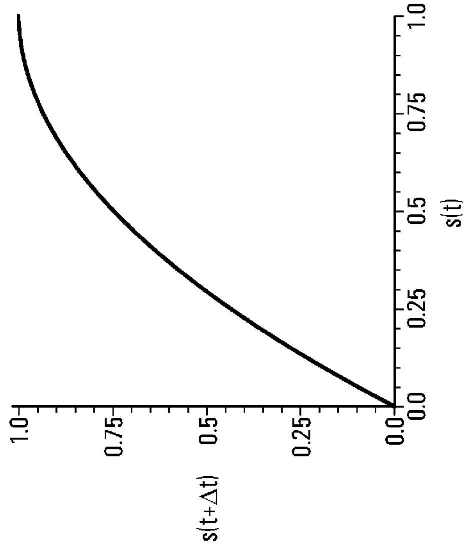
FIG. 10 is a plot of $s(t+\Delta t)$ as a function of $s(t)$ for a recursive sigmoid function.

In Eq. (6), r is a constant that determines the rate of growth of the function, and K is a constant that determines its maximum asymptote. An example plot of the score, s, as a function of time, t, based on this recursive formula is given in FIG. 9. An example plot of s(t+Δt) as a function of s(t) is given in FIG. 10.

Network Analysis

Network analysis in the case of a neural network model refers to compiling a database of address with determined confidence parameters, based on node associations and their weightings or link strengths.

In one embodiment, a network analysis algorithm determines the following three key items:

1. What constitutes a complete address?
2. What is the confidence of this address?
3. What is the rate of change of this address (Latency)?

Regarding address completeness, and with reference to the example model 10 (FIG. 1), an address synthesis system could be configured to require that a complete address must have, at a minimum, connections from the Province layer to the Street Number layer. All possible connections between these layers will determine the database of addresses. It should be noted that some addresses will extend into the Building Type and Unit Number layers as well. According to one embodiment, the confidence associated with an address will be given by the weightings between its node connections, as follows:

$$\text{conf}=\beta_{PROV-CITY}w_{PROV-CITY}+\beta_{CITY-PC}w_{CITY-PC}+\beta_{PC-ST\_NM}w_{PC-ST\_NM}+\beta_{ST\_NM-ST\_NO}w_{ST\_NM-ST\_NO} \qquad \text{Eq. (7)}$$

where, $$\beta_{PROV-CITY}+\beta_{CITY-PC}+\beta_{PC-STREET}+\beta_{STREET-UNIT}=1.$$

Here the β parameter represents the strength or importance of that node layer connection in the address.

To determine the rate of change of an address, the system could store a historical record of its confidence, conf. The rate of change is then given by dconf/dt. The amount of time needed for an address to satisfy a stability threshold condition determines the latency for the address to acquire a stable confidence value. In Eq. (8) below, $S_{thres}$ is the stability threshold parameter, which is a tuning parameter that will determine when a address confidence is considered "stable".

$$\frac{d\,conf}{dt}=s_{thres.} \qquad \text{Eq. (8)}$$

As noted above, the address synthesis module 70 may support one or more address intelligence functions 76. FIG. 4 is a block diagram illustrating examples of such functions, any or all of which may be used in synthesizing and/or analyzing delivery addresses.

The first intelligence function shown in FIG. 4 is an enhanced parsing function 100. Embodiments of the present invention do not rely on the parsing capability of existing mail sort equipment that was built for a different purpose, namely to lift full address text lines from mail images to preserve originality as much as possible. The parsing function 100 focuses on parsing unit numbers in address text lines for higher completeness and accuracy in some embodiments. It provides the intelligence to select the most probable outcome from a number of possibilities in address text based on where the unit number is detected in the text lines, the order of appearance of other word strings, and their spatial relationships to each other. Patterns are developed and the system is trained or otherwise configured, by storing patterns in the reference database 78 (FIG. 3) for instance, to recognize that some patterns have higher probability of being correct over others.

One basic principle of some embodiments of the invention is to permit every empirically observed address, regardless of validity, to either add new nodes to a node tree or influence link strengths between existing nodes. In this design approach, an effective mechanism to deal with random noise and systemic noise may be desirable. Random events of invalidity and optical reading errors are examples of background noises with persistently very low probability measures. Random noises are filtered out by the system based, for example, on the thresholds for minimal confidences and/or other defined filters such as incomplete addresses or invalid addresses or address codes such as postal codes or zip codes. The screening and parsing functions 62, 66 of the pre-processor 60 can potentially handle some of the filtering of random noises, such as incomplete or logically incorrect records. System set-up parameters on minimal confidence thresholds or a Forgetting Algorithm can be used to eliminate random noises as well, since the achieved confidences of new addresses created by random events are very low and therefore erosion to elimination can be relatively fast.

Systemic noises are temporal incidences coming primarily from incorrect addressing by mailers on mail items, or presentation formats or printed fonts which may create optical reading biases and incorrect interpretations. These types of problems usually persist for a while until they are corrected by the mailers or receivers. Systemic noises are handled by a noise forgetting intelligence function 102, also referred to herein and described above as a Forgetting Algorithm, which analyzes patterns of significant temporal events, and literally "forgets" by means of lowering their confidence or probability measures until elimination if the irregular incidences, however strong, were not reinforced by new observations over time. The ability to "forget" can be a useful mechanism in that it provides effective control over unwarranted irregularities in the observations. It also ensures that the growth of synthesized addresses follows a well behaved saturation growth curve in a relatively quick manner, and growth after saturation is in sync with actual demographic growth.

The unit number data structure indicator function 104 analyzes the data structure of apartment unit numbers and their distribution pattern in a multiple unit building, and makes intelligent corrections and decisions on the completeness and validity of the observed unit numbers.

The adaptive learning function 106 provides self-learning capabilities to deal with pattern variations, addressing characteristics, density distributions, and/or other demographic and geographic characteristics in delivery services. For example, a region with a high volume of input records may warrant a slower learning rate to increase accuracy, whereas in a low-volume region the system might compromise accuracy and learn faster in order to achieve the same level of completeness and latency. Alternatively, for the same accuracy, a low-volume region at the same learning rate would take a longer period to achieve the same level of completeness. A goal of adaptive learning is to normalize the completeness and latency of the system across geographical regions while maximizing overall accuracy in the process. Similarly, the rates at which addresses are "forgotten" in the noise forgetting function 102 could also potentially be self-adjusted based on regional mail statistics and the set learning rates. A mature residential area, for instance, might warrant a much slower "forgetting" rate than a prime real estate area with high construction activities, since the mature area would be expected to have a higher level of mail traffic and the new area would be expected to have more frequent address additions or changes.

The growth and consolidation function 108 detects changes of established addresses in a given region where a prior single address has grown into a multiple-unit building with multiple addresses, or several prior addresses have been consolidated into a single address. In the case of address growth, new inside unit numbers appended to the old street numbers are observed. When the inside unit addresses become persistent and achieve certain probability thresholds, the prior house address or addresses are updated in the synthesized addresses data store 86 to indicate their incompleteness and a changeover to a multiple unit building with the add-on unit numbers is made. In the case of consolidation of several inside or outside addresses onto a single inside or outside address, the single address may have a partially new component, such that 101A Main Street and 101B Main Street become 101 Main Street for instance, or one address completely consumes the other ones, for example, Suite 1001 and Suite 1002 become Suite 1001, and Suite 1002 no longer exists.

As an inactive address could simply mean it is unoccupied, the growth and consolidation function 108 might distinguish invalid addresses from inactive addresses. In addition to using pattern analysis, mapping, and/or logical arguments, the growth and consolidation function 108 could potentially establish from prior observations seasonal baselines of mail activities in the region as well as in the neighborhood that are relevant to a group of addresses in question. The activity baselines can provide contextual movements of the larger regional population and neighborhood cluster to more accurately analyze events on single addresses. In some embodiments, the growth and consolidation function 108 relies on outlier trend detection from the activity baselines, and uses geospatial clustering to reinforce the detection.

Because the values of outside street addresses and inside building addresses might not be identical for all mailer activities, the outside/inside address intelligence function 110, with separate probabilities or other confidence measures, can be provided in some embodiments. This function measures validity of every synthesized address up to at least an outside street number. Where applicable in multi-unit buildings, it provides additional measures to indicate validity of every unit number associated with the building, and a combined full address indication which includes all outside and inside address attributes, excluding occupant name where privacy is a concern.

The French address function 112 handles French language inputs. More importantly, it provides mapping and intelligent decisions on equivalency to avoid the same delivery point being wrongly considered as two or more separate delivery addresses because of language differences and habitual variations of French speaking and English speaking mailers in addressing mail items. This type of intelligence function could be provided for other languages, instead of or in addition to the French language. It should also be appreciated that the English language is also intended solely for the purposes of illustration. The "base" language need not be English, and could depend on where an information synthesis system is to be deployed.

Some address components, regardless of language, have significant variations in practical usage. The equivalency function 114 is provided in some embodiments to determine whether certain names are equivalent and interchangeably used for the same delivery entity. For example, at the city level a greater metropolitan area could include several townships. In this context, the city name "Toronto" in practical usage in Canada refers to the Greater Toronto Area and several inside townships like Scarborough as well as the old city of Toronto itself. The synthesis process according to an embodiment of the invention would determine that the names of Scarborough and Toronto are equivalent and interchangeable. However, for the same delivery point, the system might only generate one synthesized address with the most prominently observed city name. In the case where a legally correct name exists, equivalent names could be listed as valid aliases in the reference database 78 (FIG. 3) for instance, and used by the equivalency function 114 so that the legally correct name overrides the prominence decision.

The equivalency intelligence function 114 might also or instead be applied to street name variations, including misspelled street names, inconsistent usage of street strings such as Road, Street, Trail, etc., and/or no street strings at all.

Although dictionaries such as a postal or zip code directory could be used by the equivalency intelligence function 114 for correction, in some embodiments dictionaries are not relied on or used to eliminate valid deviations. All significant variations could be kept in order to maximize address interpretation and successful sorting and delivery to the mailing addresses on live mail, even when the mailing addresses include such variations. A valid or significant deviation is an unofficial alias which continues to have significant observation in live mail. Without significant continued usage, the noise forgetting intelligence function 102 will downgrade and eventually remove the alias when its confidence is below a threshold. According to an embodiment of the invention, a valid or significant deviation will be maintained and mapped in a synthesized address for the purpose of enhancing sorting and delivery success as long as there is continuous usage. Through the ongoing collection, synthesis, and confidence updating mechanisms disclosed herein, infrequent variations would eventually accrue low confidence values, and accordingly retaining such variations would not likely have a negative impact on long term system performance.

Names are a delivery attribute in rural Canada, where there might not be any civic street names and street numbers for households and businesses. The associations of names to delivery locations are provided by local delivery agents based on individual personal knowledge. As shown in FIG. 2, names may be treated as an address attributes at the bottom layer of an address hierarchy. Name synthesis involves two intelligence functions in the examples shown in FIG. 4.

The business name identifier function 116 identifies business names. This identification could be based on occurrence of certain linguistic key words in an addressee name, such as Inc., Co., institution, titles, and/or certain nouns that indicate the general nature of the words. A directory of registered business names which can be imported, supplemented, or self-learnt by the business name identifier function 116 might also or instead be used. A directory of address codes such as postal codes or zip codes might also be checked for any direct affirmation that an observed address is a business address.

The most probable name function 118 determines, with a confidence or probability measure, the most probable correct name from observed variations at an address. For a business name, the most probable name is either directly extracted from a reference directory of registered businesses if available, or determined from prominence analysis of the observed name variations. Prominence analysis selects a name that is most prominently used for the given address, for example. The prominence analysis considers a number of intelligence indicators including repetition, spelling, language, syntax, and local usage where applicable. The most probable name indicates that it is the correct full business name. The confidence of the decision is indicated by a probability measure in some embodiments.

For a personal name, the most probable name function 118 determines family name, first name, and middle name including initials and titles on the addressee text lines using syntax analysis, occurrence order of the words, degree of word sharing, and/or structural consistency in all the mail records for the address. For example, the last word on the first line of delivery address text has a higher probability of being the family name. Probability of family name increases if the same word occurs in many records with different associative words before or after the word, and its occurrence order is persistent.

The most probable name function 118 might also determine different family names by analyzing and measuring positional similarities and changes of alphabetic characters in words, their levels of occurrence in the records, and similarity of the associated first name and middle name. Variations of the same name are grouped into one set, and each variation has an associated occurrence frequency. Third party family name dictionaries and/or other name based data sources can be used as cross references if available. The most probable name function 118 declares a name in the variation set to be the most probable correct spelling of the family name. Similar handling could be applied to variations in addressee first name and middle name.

The synthesis of names serves to identify correct addressee names at a given location in order to enhance reliable and successful first-time delivery, which might be applicable mostly in rural areas where delivery is effectively by name. However, the name intelligence functions 116, 118 could also or instead be used to synthesize business names and/or personal names in urban addresses as well as in rural addresses.

Because an individual may have multiple names or can be correctly addressed differently by various mailers, mailing addresses alone might not provide sufficient information to uniquely associate names with individuals. However, with additional data it may be possible to uniquely map names to individual persons at a given location with higher precision and accuracy. Additional data mapping can come from any relevant data sources, including but not limited to mapping mailers, mail types, and traffic times to receivers, and cross-mapping address-name pairs with external data sources such as utility services, credit bureaus, voter lists, governmental services, etc.

Computing methods and systems according to embodiments of the invention may thus be enabled by special artificial intelligence to synthesize delivery addresses and occupant names with confidence measures, using rudimentary addressing data elements extracted from mail traffic on mail processing equipment. Addresses, including occupant names, may be represented by rudimentary make-up attributes linked as a path on a hierarchical tree-like structure to delineate their associative spatial or logical relationships.

The synthesized address directory 80 is an example of an output module. It includes a data store 86 which stores, illustratively in a database, information that may include any or all of: a) address attributes of synthesized addresses in hierarchal form; b) associated confidence information such as a probability of validity of each synthesized address, possibly including inside apartment unit where applicable, and separately confidence information such as a probability of an outside street address where applicable; c) the date and time when the confidence or probability values were last updated; d) significant equivalent alias addressing names known to be used by mailers; and e) the most probable business name or personal names and significant variations, each with a confidence or probability value.

For rural addresses that have no street component, the following attributes could be included in the store 86 where applicable: a) location attributes such as country, province or state names and city or town names; b) address codes such as postal or zip codes; c) rural delivery route number; d) the most probable business name and significant variations with confidence or probability values; e) the most probable personal names differentiated into family names and first/middle names, and significant variations with respective confidence or probability values.

In one embodiment, there are four types of confidence measures associated with a synthesized address, including confidence measures for an outside address only, a full address with inside unit number where applicable, every different variation of an addressee name itself as being a correct name with an indication of one or more most probable correct names, and finally an association of each most probable correct addressee name to a full address as a most probable correct location address of the addressed individual or business. Confidence information associated with a synthesized address might be indicative of any one or more of these confidence measures.

The integration and/or reporting services 82, 84 of the synthesized address directory 80 permit access to the database 86 of addresses with confidence information, illustratively in the form of probabilities in the range (>0 to 1.0). Reporting services provided at 82 could include, for example, query and response services for users and/or business applications to enable access to any data, analysis, and information such as name and address contents, validity probabilities, volumetric counts, etc. that can be created and reported based on the input mail data and/or address synthesis results. Integration services at 82 might include services such as import and/or export data services and business services. For example, integration services 82 might support any or all of importing external data sources or analysis applications to cross-map data attributes, validate data sources, and/or extract analytics, exporting selected synthesis data in an integrated enterprise environment to other business applications and databases including systems/applications that manage sort plans and directories of sorting equipment, or systems/applications that manage letter carrier routes and/or other network resources, and possibly other import and export functions.

While the address synthesis module 70 might transfer all synthesized addresses to the synthesized address store 86, the integration services 82 could either filter those addresses before they are written to the store or delete synthesized addresses from the store such that the list of synthesized addresses in the store is truncated to include only the addresses that are above a minimal threshold. For example, only addresses that achieve over 90% probability and/or a certain level of stability might be maintained in the synthesized address store 86. Such filtering might also or instead be applied by the integration services 82 when integrating synthesized addresses into address databases that are used by the mail sort equipment 44 and/or the reporting services 84 when reporting synthesized addresses to other applications or services 92, for instance. User and/or application interfaces may be provided to permit user selection of synthesized addresses in the store 86 including names based on their probability values at last update time. Updates can be as frequent as operationally beneficial, and in one embodiment updates are ongoing in real-time as data are collected from live mail. Transfers of mail records, mail record data, and synthesized addresses and related information between components of the system 30 may be scheduled or otherwise initiated accordingly.

Other filtering options, based on such parameters as the most recent confidence or probability update time or particular values of addressing components, are also contemplated.

The synthesized address directory 80 may support further functions, such as any or all of: enabling interactions with users to manually affirm or negate synthesized addresses, archiving historical synthesized address information in the data store 86 or elsewhere, and enabling interaction with a street map to provide a user interface which shows on a display device a spatial relationship of selected addresses to a delivery depot.

One possible use of the system 30 is in the provision of useful intelligence to optimize delivery service efficiency. The network intelligence analysis function 94 or some other application or service 92 could be provided to map synthesized addresses including names in the synthesized address directory 80 onto volumetric data in the record pre-processor 60, which contains data from original input mail records. Such analytics could provide useful intelligence and operational knowledge, including but not limited to, characterization of addresses and receiver names based on mail volumes, mail types, mail sources, and cyclic patterns; clustering of mail receivers to optimize service provisions and delivery cost effectiveness; and characterization of addressing errors and their distributions to improve service efficiency. Information that is generated by or is used by the application(s)/service(s) 92 and/or the network intelligence analysis function 94 is stored in the application/service database 96. Any or all of this information could also or instead be exchanged with other components of the system 30 as well. Another example of an application or service 92 is an application that uses the synthesized address directory 80 to detect and correct addressing errors in electronic mailing lists of mailers before print production.

As mail records that are provided to the record pre-processor 60 are created from MLOCRs 56 and possibly other mail sort equipment 44 in near real-time at originating plants, they can be used to establish network load profiles from origins to destinations. The network intelligence analysis function 94 or another application or service 92 may be used to optimize sort and delivery configurations. Because every mail record is uniquely identifiable by means of its VES barcode 124 (FIG. 5), which contains encoding time and location, transaction flow times can be tracked along the processing and delivery system to monitor service performance, at the mail piece level or in terms of aggregated statistics.

At originating plants, a network load distribution profile can be established in near real-time on a continuous basis using the mail record data in conjunction with a current network routing roadmap. A network routing roadmap is a time schema of how mail is sorted and transported along the network from collecting origins to delivery destinations. Volumetric counts by destination address code such as postal code or zip code, for example, could provide data on demands on various resources in the network. The day/time in a VES barcode and service standards of mail items, explicitly indicated in the records or implicitly known, can provide information on allowable network flow times.

The data from all originating plants could be consolidated in near real-time to create a total demand profile on the network for the current mail collection cycle, which can then be added to the last few collection cycles to create an immediate known workload and demand time series to complete all the collection cycles. Mail processing or delivery service plant managers can see an expected local capacity demand profile and a dock-to-dock arrival and dispatch transportation schedule. Bottlenecks and slacks in the network, including future bottlenecks or slacks predicted on the basis of the demand profile, can be shown immediately. Adjustments on the routing schema and network resources such as sort plans, interplant shipping modes, truck sizes, dispatch frequencies and dispatch times can then be made. Optimization and decision making applications can be used to evaluate and automate operating decisions to leverage service performances against capacity costs.

Service performances can be monitored at the mail piece level and/or at the bulk level. As mail pieces are scanned at automated sort equipment and possibly other devices such as handheld devices along the network, the unique VES barcodes can be tracked and reported. The new scanned locations and scanned times, in conjunction with the location and time indicated in the VES barcode 124 (FIG. 5), the destination postal code at 126 in the example shown in FIG. 5 and service(s) explicitly identified at 136 or implicitly known, are then used to compare against a planned routing schema. The comparison provides compliance and non-compliance feedback at the mail piece level, which can be aggregated to a bulk level to evaluate network performances and processing efficiency. Management personnel can look at different processing scenarios to leverage earliness and tardiness in order to maximize utilization of available resources at minimal cost. The statistics can be used to generate service performance reports on a specific mailing, a specific mail piece, a specific delivery area, or an overall performance report on a specific mailer, for example.

Thus, address synthesis is not the only possibly application or service which might be implemented to synthesize mail management information using collected data and/or synthesized outputs from other applications or services.

In general, synthesis of mail management information, regardless of whether the synthesized information includes addresses or other types of information, could be directly enabled by and tied to data collected from physical mail processing. At least the following categories of mail management information synthesis applications or services are contemplated:

- service delivery compliance management;
- network proficiency management, which could be characterized by short term operational proficiency and long term network configuration proficiency;
- delivery route proficiency management;
- customer compliance management, which might have a revenue protection subclass and a mail preparation and quality subclass; and
- enablement of new service features.

There could be various ways to implement modules which support such applications or services, and implementation details may depend to at least some extent on the particular environment in which an application or service is to be deployed. The overall framework set out below and the further teachings provided herein would enable a person skilled in the art to practice embodiments of the invention, including data collection and mail management information synthesis.

In the example data collection network 40 in FIG. 3, only one installation of mail sort equipment 44 is explicitly shown. However, an actual implementation of a mail network could, and likely would, include several quasi-independent regional networks, each having a mechanized mail processing plant at the top of a hierarchy of facilities as a single point of entry and exit between regional networks. This view is suitable, for example, where mail network coverage has geographic and demographic characteristics. In Canada, for instance, delivery points are spatially clustered, but in some cases with significant distances between them.

Within a regional network, there could be an outer tier of induction points from which mail is collected, such as street letter boxes, retail outlets, and bulk drop-off facilities for large volume mailers, as well as an outer tier of delivery points which are all the delivery addresses in the regional network coverage. An inner tier might then include a hierarchy of routing and distribution nodes, with fixed and sometimes mobile facilities connected by ground and air transportation according to a schema of operatives such as routing, transportation mode, carrier capacity, and dispatch frequency. The delivery routes of individual foot carriers and motorized carriers connect the last inner tier mail network nodes to individual delivery points. Such a mail network might be expected to satisfy various requirements and operate within certain constraints, for example end-to-end service standards which stipulate the maximum allowable flow times for a given item from a drop-off induction point to an exit delivery address, proficiency targets to deliver the services, and contractual limitations.

The operating relationships between any two regional networks involve arrival times of workloads from an upstream network, the sorted level of incoming mail pieces, and the purity of containerization. Arrival times determine the balance of allowable processing times in the receiving regional network before delivery, sorted levels determine the remaining piece sorting and consolidation workloads, and purity of containers determines the demands on material handling, segregation and consolidation of mail pieces and containers. The summation of arrival profiles from all other regional networks plus its own collection and forwarding profile provide the necessary data to determine total demands in a cycle for a given regional network.

A container might be a primary container or a secondary container such as a pallet, which includes multiple primary containers. A pure container includes only contents that are to be sent to a common next work center. An impure (mixed) container includes contents that are to be sent to more than one next work center and will therefore involve additional sorting of primary containers in a secondary container, mail groups/types inside a primary container, or both. Pure containers minimize work segregation but might entail use of more containers. Thus, there is a potential opportunity to optimize container sizes in conjunction with sort schemes, routing schemes, volumetric characteristics, labour costs, transportation costs, and fixed capacity costs such as containers, material handling equipment, mail piece sorting equipment and facility costs. These are mutually dependent parameters.

Regional network demands can be causally non-exclusive in that arrival and dispatch times, sorted levels, and containerization could be shared parameters which can be optimized using suitable optimization tools such as mathematical programming and event simulation for a given constrained network.

This architectural view of a mail network provides a base level architecture on which to build mail management information synthesis in some embodiments.

In respect of the first application or service category listed above, namely service delivery compliance management, a "ground" layer of load projection applications could be provided. In this case, the data collected from processing of physical mail items forms the bottom layer of input data. In some embodiments, near real-time and accurate volumetric counts and destinations data in one regional network could be used to synthesize local originating profiles within that network and/or forwarding arrival profiles to downstream regional networks. Historical data could be used to synthesize projected near term volumetric distribution trends before completion of load processing, which could in turn provide maximal lead time to adjust system parameters such as transportation scheduling and cubic requirements. Cubic requirements relate to cubic volumes, which in turn determine truck or other transport mechanism sizes, dispatch frequencies, and shipping costs.

Load projection is an example of a type of application that can delineate relevant collected destination, time, and location data and synthesize such mail management information as near term and short term volumetric loading profiles on regional networks according to a schema of network routing and transportation.

Service compliance management might also include a second layer of applications for event analysis. Service monitoring, service diagnostics, and correlative analysis applications are described below as illustrative examples.

In some embodiments, there are several types of applications working in conjunction. One type is used to monitor transaction flow times of individual mail items in a given network with respect to service standards. This is followed by diagnostic analysis of problematic links to identify and characterize causal relationships and underlying problems such as machine errors, addressing errors, and mail preparation quality that affects erred routings. Input data could include the tracking VES barcode or any unique barcode identifier captured from the mail items at all scanning locations, which would provide a track record of flow of every mail item in the mail network, as well as a schema of background sorting and routing. Aggregated records provide overall performance statistics, which can be compared to standards, on any origin-to-destination links regardless of the routings between the origin and destination.

Correlative analysis applications are another type of analysis application. A correlative analysis application analyzes correlative behaviours between link performances and the driving variables such as volumes, equipment capacity, transportation, and mail quality for a given mail network routing setup in order to project near term future performances on new input volumetric distributions in load projection applications. Correlative analysis might therefore involve determining driving elements and their statistical relationships in order to project an end result given a set of driving elements.

The event analysis applications may thus use both collected data and outputs of the ground layer load projection applications.

Corrective analysis and reporting are combined with service monitoring and diagnostics to provide a closed loop system in some embodiments. For example, if mis-sorts to a destination or cluster of destinations is detected, then the detected problem could be forwarded to the responsible personnel, and duly investigated, corrected and reported, thus closing the loop. In some mail networks, automated corrective analysis and reporting may be feasible.

Corrective actions might include, for example, the generation of work requests or orders, forwarding work orders to responsible individuals to investigate and correct problems, status display, and status reporting including authorization and linkage to a parts inventory management system or application.

Higher-layer applications could be provided in the network proficiency management category. Operational proficiency applications, for example, could be used for short term operational proficiency management. Mail management information synthesized by the service monitoring and diagnostic applications in the second layer could be used to characterize mail network links as controllable operatives and uncontrollable operatives. Controllable operatives have immediate adjustable performance parameters such as transportation modes and schedules, cubic capacity, purchasable manpower, and inter-network sorting and routing plans to leverage slacks and bottlenecks. Uncontrollable operatives involve resolution to change setup parameters, such as renegotiation of sourcing contracts and collective agreements, reconfiguring hierarchical relationships between network nodes, or making capacity changes to fixed assets. One function of operational proficiency applications is to manipulate controllable parameters in order to achieve service compliance in all the links for new load distributions at minimal network cost. This could be achieved, for example, by a costing model working in conjunction with a performance simulation model. Execution of changes may be fully automated if they are within a pre-approved automated environment, for instance. Alternatively, suggested changes could be reported to a management authority for authorization and manual execution. In the case of network proficiency management, the synthesized mail management information includes such suggested changes.

Network configuration proficiency applications, at a next higher level in a framework in some embodiments, relate to long term network configuration proficiency management. Inputs might include future business requirements such as product specifications, forecasted volumes, planning cycles, and financial targets. Adequacy and opportunities for further optimization of an existing mail network are determined, and mail management information in the form of a new optimal configuration and setup for the mail network is synthesized. This type of application could be implemented, for example, by an integrated composition of life cycle network cost modelling, process simulations to generate network events and service performance statistics, pattern recognition intelligence to identify and analyze systemic behaviours, mathematical programming to optimize system objective functions, and peripheral management applications such as asset management, capital projection, volume forecast, risk analysis, and project scheduling.

Thus, in some embodiments, an operational proficiency application optimizes service performance and operating costs under given network constraints, and a network configuration proficiency application optimizes life cycle cost of the network, which includes operating costs and fixed asset costs for given business needs including service performance.

Synthesis applications or services in the delivery route proficiency management category might include such applications as a route sequence optimization application and/or a sort plan configuration application at the third level in the example framework. In addition to attempting to minimize travel distance, applications in this category might be used to optimize delivery service that involves differential treatment of addresses based on service needs and cost efficiency, where routes are more dynamic and adjustable to actual workloads. In conventional practice, route configuration and consequently sort plan configuration are discrete and sequential separate events. In some embodiments of the present invention, the configurations of sort plans and route sequences are integrated as one consolidated function such that the dynamic element of due times and service needs can be considered in order to maximize system efficiency. The time tracking capability on mail items along the mail network directly enables real-time generation of delivery due times on every item.

Since mail items that are destined for a large cluster of addresses could be sorted and sequenced into routes by equipment in substantially simultaneous step processes, it is feasible to consider delivery due times of individual mail items as a priority decision parameter. The ability to consolidate early delivery to due day could reduce visiting cycles to some addresses, for example from a daily cycle to a two day cycle. It also enhances compliance to target day delivery according to service standards. The inclusion of due times as a sort element in mechanized processes represents a significant departure from prior practices in lettermail processing and delivery.

It may be important to understand the impacts of deferring some early delivery to service due day through data and process integrations of routing and sorting, and to manage any changes that are made to support such deferrals. The impacts may include, for example, longer operating hours on fixed assets for the same mail volume (implying that less equipment could be deployed), smaller plant footprints, fewer vehicles, and alternate day visiting cycles to some delivery points. Delivery system management applications could be provided at the fourth layer of the framework for this purpose in order to create a feasible and effective operating environment to manage and execute changes.

As in network configuration proficiency applications, delivery system management applications could synthesize mail management information by working in conjunction with data collection and other synthesis applications or services to assist stakeholders in identifying and resolving issues, defining and managing changes, and feeding the results as new mail network requirements to manage overall mail network proficiency.

In the category of customer compliance management, synthesis applications such as a revenue protection application and a mail preparation compliance application are contemplated. Revenue protection might involve a set of applications that control postage or other service payment fraud and insufficiency of payment (short payment). A first functional aspect could be automated authentication and verification of information based on postage stamps, postage meter indicia, and/or other service payment indicia. This process can take place inline in real-time when the indicia barcode on a mail item is scanned by equipment or a handheld scanner. In the event of failure, the item image could be preserved and tagged immediately, with the indicia data and verification result. In one embodiment, the record is forwarded to a fraud control database or other entity for further processing. The physical item may or may not be withheld, depending on a preference or policy.

Another aspect of revenue protection might be to check for replay of authentic indicia. All newly checked indicia with their associated images can be saved in a temporary database which has an application to check for duplicates in the batch against all used indicia that have not yet expired. New duplicates and their associated images could be forwarded to a fraud control database or other entity which has applications for further data extraction and mapping of data elements to analyze trends and patterns, for example. Records in a fraud control database could be digitally stamped or otherwise protected to prevent unauthorized changes. Fraud analysis applications and a fraud control database could also provide interactive functions with security investigators.

Security key management might also be involved in revenue protection, to manage the issuance and secure transport of digital keys in the mail network. Digital keys might include cryptographic encryption/decryption keys and/or root keys including their derivative keys for signing/verifying digital signatures, for example.

Mail preparation compliance management could be provided to support correct billing to account customers who induct mail with self-declared shipping statements. The data collected from mail items provide unique item counts, batch statistics of OCR performance, confirmed service provisions, and other billable services such as processing of returns. The main functions of this type of synthesis application or service are to verify the service that is actually provided against shipping orders, to support manual reconciliation of exceptions, and to correctly bill mailers accordingly.

These synthesis applications or services could be implemented at the second layer in the example framework, since they operate on the data collected from mail items. Higher-layer implementations are also contemplated, where the outputs from other synthesis applications or services are to be taken into account in assessing customer compliance management.

Under the broader category of enablement of new service features, various types of synthesis applications or services are contemplated. Illustrative examples are provided below.

A visibility service application could provide an additional layer of web-based services and data mapping capabilities wrapped with other supporting applications to enable senders to query, online, the processing status of their mail at a mail item level or the performance status of an inducted batch, such as a current status of the percentage of successful deliveries by location. A key enabler could be the service monitoring application, which as described above tracks the movement of individual mail items in a mail network. The visibility service application could provide an online function of issuing a visibility identifier code to customers to put onto their mail items before induction. The identifier code can then be applied to one or more mail items depending on the service features requested. In one embodiment, identifier codes are collected together with other data elements and cross-mapped to network tracking barcodes such as the VES barcode.

An address cleansing application could make use of synthesized addresses and other databases such as a change-of-address database to verify and correct addressee names and addresses provided by mailers electronically before mail production and physical induction.

A delivery notification application might use collected destination information and images of mail items and forward images to addressees' electronic addresses as delivery notification. Event management capabilities could prompt for and manage delivery instructions and delivery confirmations.

Another example of a synthesis application or service in this category is an addressee verification application which uses the name and address association in the synthesized address directory to check for a correct match as printed on a mail item. This could provide an additional feature to alert a sender prior to induction if there is no confident match, or to upgrade delivery to a higher security procedure that requires a visual identity check before delivery.

Collected mail item data might also or instead be used by an address statistics application to synthesize statistical relationships and/or behavioural patterns of useful attributes, for example mail volume, hit density, gender of addressed occupants, and number of addressed occupants. These statistical relationships or behavioural patterns can further be mapped onto other demographic and economic statistics to generate useful business information.

Clearly, data collected from physical mail items may be used for any of various purposes. In the example framework set out above, bottom layer data might include piece level delivery addresses, first noticed locations and times and service requirements. Mail management information synthesized at a first higher layer based on the ground layer data might include load projection outputs with associated network operatives. At a second layer, mail management information in the form of projected service performance could be synthesized by various service compliance management applications. Third layer proficiency management applications input mail management information that is synthesized by lower layer applications, and possibly ground layer data as well, and synthesize a new re-optimized sort and delivery schema for new projected loads. Raw data and projected distribution loads on a network are driving inputs for second layer and higher layer applications, and service compliance management applications might serve as execution and system control enablers, with the objective function to minimize total operating cost subject to constraints. Other applications or services could also be provided within this type of framework, and examples of such applications or services are also described above.

Mail management information that may be synthesized in accordance with embodiments of the invention includes, but is in no way limited to, addresses. Address synthesis relates to one illustrative embodiment. Other synthesis applications or services may use the same collected data as address synthesis, a subset of that collected data, mail management information output from one or more different synthesis applications or services, additional data from other sources such as shipping statements, or some combination thereof.

How input data are obtained by each synthesis application or service may also vary. For instance, a data distributor might receive the data collected from physical mail items, track the types of data which are needed by each synthesis application or service, and distribute the collected data or subsets thereof accordingly. A synthesis application or service itself could be responsible for accessing the data it needs, in a repository such as the mail record data store 68 (FIG. 3). Similar distribution mechanisms could be used where mail management information that is synthesized by one synthesis application or service is used by one or more other synthesis applications or services.

To summarize, raw data are captured from live mail, and data records are transmitted from sort equipment at distributed locations to a national computing location in some embodiments, where data from captured records are extracted and data is reliably parsed into a useful form ready for synthesis digestion. Associative techniques are applied in the case of address synthesis to measure link strengths and path strengths effected by input data, and one or more intelligence functions may be used to interpret input data and control the synthesis process. Addresses including occupant names, each with a probability measure or other confidence measure of validity, are synthesized and newly synthesized addresses may be output, illustratively to update the life-long probabilities of validity on prior synthesized addresses and/or to retire obsolete addresses. Users such as personnel of a postal authority or other deliver service provider may manage and interact with a computing system implementing address synthesis and related functions in an enterprise production environment.

The intelligence functions may involve, possibly among others, one or more of the following:

- analyzing occurrence position and syntax association to enhance the parsing of inside unit numbers and box numbers from addressing text lines optically read by mail sort equipment;
- recognizing, measuring, and removing random background noises caused by random irregular events;
- recognizing, measuring, and progressively removing unwarranted systemic noises caused by incorrect but significant singular events with controllable noise removal latency;
- analyzing unit data structures of multi-unit buildings, establishing comparative references to template single inputs, and determining and supplementing erred or incomplete unit numbers;
- self-adjusting a synthesis rate and accuracy based on regional characteristics of input mail, including delivery volumes, distribution density, event regularity, seasonal fluctuations, and/or geographic features;
- recognizing growth of a previously single address into multiple addresses;
- recognizing consolidation of previously multiple addresses into a single address;
- establishing volumetric patterns at regional and vicinity levels to differentiate and normalize seasonal and economic fluctuations;
- recognizing addresses written in different languages, including but not limited to the English and French languages, interpreting common behavioral and syntax usages of the language speakers, and establishing equivalency for the same delivery locations addressed in different languages;
- establishing equivalency of city names commonly interchangeable in large metropolitans;
- establishing equivalency of interchangeable street names including spelling, street type, alias names, and re-named streets;
- differentiating business names and personal names;
- differentiating last names from first and middle names in personal names;
- establishing a most probable correct business name from a set of observed variations;
- establishing most probable correct personal names from a set of observed variations.

A system implementing address synthesis may include one or more devices to collect real-time data on every mail piece processed by mail sort equipment in a network. Raw mail records may be pre-processed, with pre-processed mail record data being distributed to multiple parallel processing units, according to geographic characteristics or address types for instance, to synthesize addresses and occupant names with probabilities of validity. Synthesized addresses and their associated probabilities and volumetric densities can be managed and updated in an output address repository, and users, business applications, and/or other components of a mail handling system or network may interface with that address repository.

Mail data collection may preserve and extract full addressing data in the address area on every mail piece read by mail sort equipment. This may include data that are not necessarily utilized for mail sorting. Full mail images with associated unique barcode identifiers may also be preserved and exported from mail sort equipment to a supplementary image processor for additional capture of return addresses and postage. Additional data could potentially be extracted from machine operating data files, to enable effective mail system resource management for instance. In order to protect mail records, security protection treatment could be applied to consolidated mail records that include any or all of this data, before such records are transmitted to other components, such as a record pre-processing system, through a communication network or other medium.

At a record pre-processing system, duplicate records and spoiled records could be identified an eliminated, as noted above. Record file names and indexing can be applied, at the data extraction module 42 in the example system 30 (FIG. 3), to facilitate record sort and retrieval. Pre-processing of mail records might also or instead include extracting location and date/time from unique machine encoded VES barcodes, parsing data attributes from addressing text lines, recognizing and segregating urban records and rural records for different subsequent treatments, applying security and privacy protection treatments, and organizing data for synthesis of addresses and/or other types of mail management information.

An output synthesized address repository may support such functions as updating addresses, occupant names, and their associated probabilities of validity, selection of addresses and occupant names by users and applications or services based on confidences, volumetric density, address type, building type, geographic location, address code such as postal code or zip code, or combinations thereof, manually affirming or negating addresses, archiving historical data, and/or interfacing with a street map to show spatial relationships of selected addresses to a delivery depot.

Synthesized addresses may be utilized in characterizing mail traffic and optimizing operational efficiency. Mail traffic data can be automatically collected from the processing network at the mail piece level, and volumetric and geographic distributions can be determined from mail piece delivery addresses. Sender mail traffic profiles, receiver mail traffic profiles, seasonal mail traffic patterns, and/or geographic mail traffic patterns can also or instead be established or determined from mail traffic data. The delivery addresses can also or instead be mapped to network resources ahead of time, illustratively to reduce process flow time. Mail transaction flow times between scan points in the process can be monitored, at the piece level and/or at the bulk level, and delivery and sort configurations can be optimized for maximal system efficiency.

Other mail handling system management functions may include, for example, collecting associated sender names and return addresses from mail pieces and alerting senders of undeliverable addresses, notifying addressees ahead of delivery, enabling interactive delivery scheduling with the addressees, and intercepting mail pieces to enable new delivery scheduling. Examples of further synthesis applications or services have also been provided above.

Regarding undeliverable or otherwise incorrect addresses, synthesized addresses could be used to verify and correct addresses in originating mail at a first read opportunity and/or to verify and redirect inline incorrectly addressed mail to the correct addresses. Addressee names and addresses could also or instead be verified and corrected electronically with mailers before print production.

Figure 11:
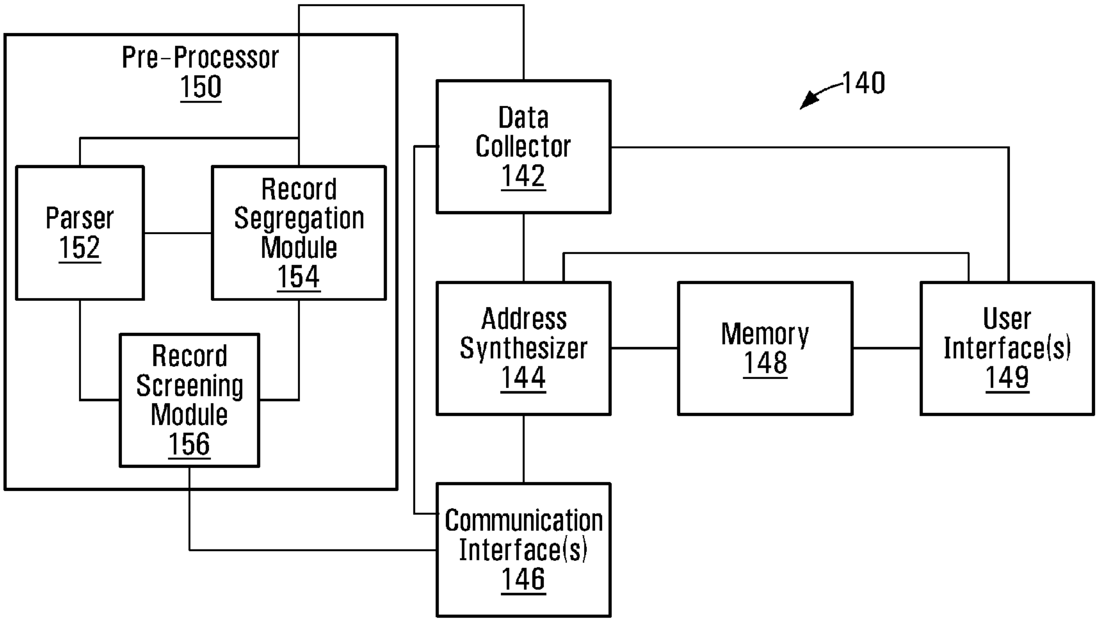
FIG. 11 is a block diagram of another example system.

FIG. 11 is a block diagram of another example system 140, which illustrates an implementation of address synthesis and possible related functions in accordance with an embodiment of the invention. The example system 140 includes a pre-processor 150, a data collector 142, an address synthesizer 144, one or more communication interfaces 146, a memory 148, and one or more user interfaces 149, interconnected as shown. The pre-processor 150 includes a parser 152, a record segregation module 154, and a record screening module 156.

Although shown as part of one system 140 in FIG. 11, it should be appreciated that at least some of the illustrated components could be distributed between different physical devices and possibly even different locations. With reference to FIG. 3, for example, the pre-processor 150 could be an implementation of the record pre-processor 60, which is separate from the address synthesis module 70. Thus the pre-processor 150 and the data collector 142 could be operatively coupled together through a network communication link in some embodiments.

An address repository or directory could similarly be implemented separately from the pre-processor 150 and/or the main address synthesis components, namely the data collector 142 and the address synthesizer 144. Thus, in some embodiments the memory 148 stores synthesized addresses, and in other embodiments those addresses are also or instead communicated to another location or physical device for storage in a separate address repository.

A communication interface 146 includes components which support communications over one or more communication links. These communication links may include, for example, a network communication link through which an address synthesis apparatus communicates with other devices in a mail handling system. Communication interface components often include hardware at least in the form of a physical port or connector. Traffic processing such as format conversions and/or security treatments may also be performed by a communication interface 146. The communication interface(s) element 146 generally represents one or more modules that enable the system 140 to communicate with other systems or devices. Hardware, firmware, one or more components which execute software, or some combination thereof might be used in implementing each communication interface 146.

The exact structure of a communication interface 146 may, to at least some extent, be implementation-dependent, and could vary depending on the type of connection(s) and/or protocol(s) to be supported. Different types of communication interfaces 146 could be provided to support communications over respective different types of communication links.

A user interface 149 might include such input/output devices as a keyboard, a mouse, and a display, for example, for receiving inputs from and/or providing outputs to a user. In some embodiments, users access synthesized addresses or control the system 140 remotely, and in this case the user interface(s) 149 may include interfaces that are remotely located. User access might then actually be through a communication interface 146. A user interface 149 could also be in the form of an API (Application Programming Interface) or some other type of interface which provides applications and/or services with access to synthesized addresses and/or control functions. It should therefore be appreciated that a user interface 149 may take any of various forms, and need not necessarily be co-located with a system or device that implements address synthesis. The structure of any user interface(s) 149 may be dependent upon the types of user interactions that are to be supported.

The communication interface(s) 146 and the user interface(s) 149 are also examples of an interface that might be used to enable or provide access to collected data, synthesized addresses, and/or confidence information from a local or remote location. Accessed information could be used for any of various purposes including but in no way limited to those specifically noted herein.

The memory 148, like the data stores shown in FIG. 3 and described above, for example, may include one or more memory devices of any of various types. Any or all of mail records, mail record data, reference information for use during address synthesis, and actual synthesized addresses and their associated confidence information may be stored in the memory 148. The actual usage of the memory 148 may be dependent upon such implementation details as whether address synthesis and other functions are centralized within one physical device or distributed between multiple devices.

The other components of the example system 140 may be implemented using hardware, firmware, and/or components which execute software. These components are defined to a greater extent by their functions rather than particular internal structures. The present disclosure would enable a skilled person to implement these components in any of various ways to perform their respective functions.

In operation, the data collector 142 collects data from physical mail items, and the address synthesizer 144 receives the collected data from the data collector. The address synthesizer 144 synthesizes addresses from the collected data, and also generates confidence information from the collected data. The confidence information indicates a measure of confidence that each synthesized address is a valid address. The synthesized addresses may include respective addressee or occupant names, in which case the confidence information indicates a measure of confidence that each synthesized address including an addressee name is a valid address.

The data collector 142 may collect the data by capturing data from live mail directly. However, as will be apparent from the foregoing description of FIG. 3 for instance, data collection may involve receiving the data from remote equipment, through a communication interface 146. Mail sort equipment is one example of equipment that could capture the data from physical mail items and transfer that data to the data collector 142. In some embodiments, the data collector 142 could potentially support both of these types of collection schemes. For example, if the data collector 142 is implemented in mail sort equipment, it might directly capture some data from physical mail items that are processed by the local equipment and also receive data that are captured by additional, remotely located sort equipment.

Data that are collected by the data collector 142 need not necessarily be in a form in which data are actually captured from mail items. Captured data are pre-processed in some embodiments. In the example system 140, the pre-processor 150 includes a parser 152 that parses the data from raw mail records that include data captured from the physical mail items, and the data collector 142 thus collects the data by receiving the parsed data from the parser. The pre-processor 150 also includes a record screening module 156 that eliminates duplicate or spoiled raw mail records, and a record segregation module 154 that segregates raw mail records that include urban delivery address data and raw mail records that include rural address data. Different embodiments of the invention may support these and/or other pre-processing functions, which may be implemented within the data collector 142, within the address synthesizer 144, or separately as shown in FIG. 11.

The address synthesizer 144 may synthesize the addresses by building a representation of each address including address attributes in a hierarchical structure that delineates relationships between the address attributes. Examples of such a structure are shown in FIGS. 1 and 2. In this case, the confidence information may include link strengths indicating associative strengths of pair-wise relationships between the address attributes in adjacent levels of the hierarchical structure. A combination of link strengths of links between a set of address attributes in a synthesized address then provides the measure of confidence that the synthesized address is a valid address.

The link strengths are updated by the address synthesizer 144 based on the link strengths following a previous collection of data, a time lapse since the previous collection, and any new occurrences of address attributes in subsequently collected data. A previously synthesized address or an address attribute associated with that address may be retired by the address synthesizer 144 where the address attribute does not occur in subsequently collected data. A node might be removed from a hierarchical structure, for example, if the link strength from the address attribute in the next higher level in the hierarchy drops below a threshold. A synthesized address can effectively be retired from a synthesized address database, in the memory 148 or elsewhere, by removing its lowest-level leaf node as opposed to all nodes in the entire address path. Thus, retirement of an address does not necessarily lead to retirement of the higher-level nodes along that address path.

The particular address synthesis procedure implemented by the address synthesizer 144 may include any of various intelligence functions, examples of which are described above.

Address synthesis need not be restricted only to generating addresses and confidence information. Those addresses may be used, for example, to configure and thereby control real-world components in a mail handling system. As noted above, the data collector 142 collects data by receiving the data from mail sort equipment which captures the data from physical mail items in some embodiments. This mail sort equipment could effectively be controlled by the address synthesizer 144 by providing the synthesized addresses to the mail sort equipment. The mail sort equipment then sorts subsequently received mail items using the synthesized addresses to support correct machine interpretation of delivery addresses on the subsequently received physical mail items, and thus behaves differently as a result of receiving the synthesized addresses.

The synthesized addresses, and their associated confidence information, could be stored in the memory 148. A complete mail handling system may also or instead include a synthesized address repository that receives the synthesized addresses and the confidence information from the address synthesizer 144. The address synthesizer 144 could provide the synthesized addresses to such a repository through a communication interface 146. The repository might include a memory for storing the synthesized addresses and the confidence information, and a user interface, operatively coupled to the memory, that enables selection of addresses from the synthesized addresses stored in the memory for output. A communication interface that enables the synthesized addresses to be transmitted to mail sort equipment and/or other components of a mail handling system could also be provided in a repository to support address distribution.

The example system 140 includes such a memory 148, one or more user interfaces 149, and one or more communication interfaces 146, and accordingly address repository functions may be implemented in the same physical device as address synthesis, separately, or both. Either or both of these interfaces could also provide access to the collected data. Thus, one or more of the collected data, the synthesized addresses, and the confidence information might be accessible.

Control of other components in a mail handling system by the address synthesizer 144 could be direct or indirect. For direct control, the address synthesizer 144 transmits synthesized addresses to controlled components through a communication interface 146. In another embodiment, a mail handling system implements an application or service for retrieving synthesized addresses and updating live mail sorting databases using synthesized addresses. In this case the address synthesizer 144 could be considered to exert ultimate, albeit indirect, control by synthesizing the addresses which in turn control at least sorting of subsequently received mail items. A separate repository for the synthesized addresses is another architecture involving indirect control.

Sorting of subsequently received mail items using synthesized addresses as described above is one example of a function that might be controlled by an address synthesis system. Other functions such as verifying addresses in subsequently received mail items, correcting addresses in subsequently received mail items, and/or redirecting subsequently received incorrectly addressed mail items to correct addresses could also or instead be controlled in a similar manner.

Address synthesis is one example of a synthesis application or service that might be implemented in a mail handling system. The data collector 142 and the address synthesizer 144 could be part of a first synthesis module in such a system, and one or more additional synthesis modules might be provided in the same system. For instance, a second synthesis module could receive input data that include one or more of the collected data, the synthesized addresses, and the confidence information, and synthesize other mail management information from the received input data. A synthesis module might use the same collected data as other synthesis modules, a subset of such collected data, all or a subset of mail management information that is synthesized by one or more other synthesis modules, or some combination of such data and synthesized information, as its input data.

In one embodiment, the synthesized mail management information characterizes traffic which includes the physical mail items. A synthesis module might synthesize mail management information by one or more of: establishing volumetric distributions of the traffic, establishing geographic distributions of the traffic, mapping traffic distributions to network resources, determining traffic process flow time for a mail network, and determining a mail network for providing a given service flow time, for instance.

An indication of synthesized mail management information could be provided to a user through a user interface, to another entity such as another synthesis module through a communication interface, or both.

Figure 12:
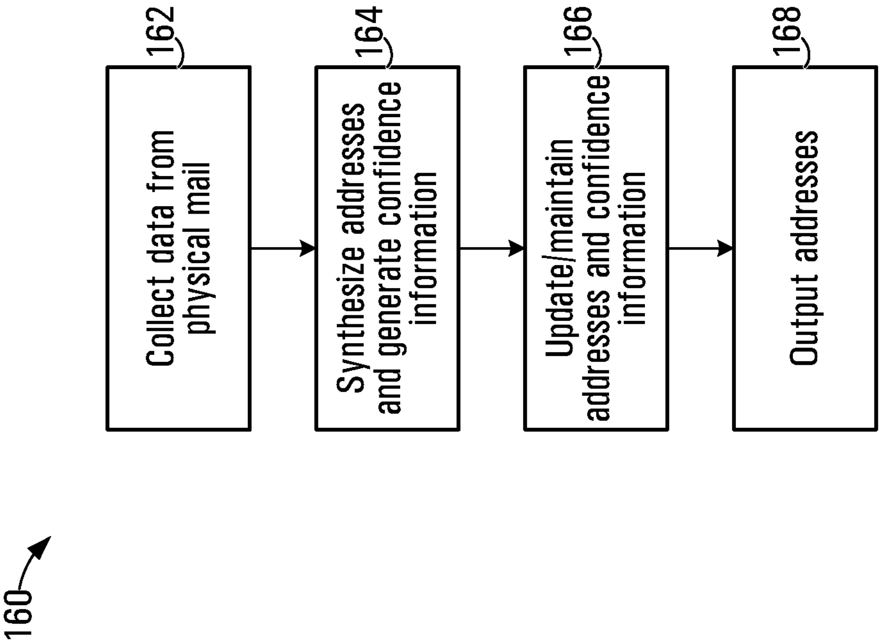
FIG. 12 is a flow diagram of an example method.

FIG. 12 is a flow diagram of an example method 160, which involves collecting data from physical mail items at 162, synthesizing addresses from the collected data and generating confidence information from the collected data at 164, updating the synthesized addresses and confidence information or otherwise maintaining an address database, illustratively by retiring addresses, at 166, and outputting synthesized addresses at 168 to control mail handling system components for instance. Although the method 160 represents a single data collection, address synthesis, updating/management, and output pass, these operations may be repeated and ongoing, as new mail items are received and processed.

The method 160 is illustrative of one embodiment of the invention. Other embodiments may involve further, fewer, and/or different operations, performed in a similar or different order. Additional variations may also be or become apparent to those skilled in the art. For example, various options for performing at least some of the operations shown in FIG. 12, further operations that could be performed in some embodiments, as well as other variations, will be apparent from the foregoing description of FIGS. 1 to 11.

Address synthesis as disclosed herein represents one example of how data collected from physical mail items could be used. Any or all of the collected data, the synthesized addresses, and the confidence information associated with the synthesized addresses could be used for various purposes, which might include, for example:

a. address cleansing of electronic mailing lists from mailers;
b. creation and loading of address directories in sort equipment;
c. creation of network loading/demand profiles for use in making decisions regarding network resources, for instance;
d. creation of machine sort/sequencing plans; and/or
e. network performance diagnostic analysis.

Implementations of such features, in general, might include some sort of interface to receive input data including collected data and/or synthesized information, a processing element and/or other component(s) to synthesize additional mail management information from the received input data, and a mechanism to provide an indication of the synthesized mail management information. Such an indication might be provided, for example, to mail system management personnel for consideration in changing mail delivery routes, sort plans, etc. so as to optimize efficiency, possibly in combination with other considerations. Another option would be to automatically provide an indication of synthesized mail management information to sort equipment in an isolated operating environment, where revising machine sort or sequencing plans would not affect downstream processing such as manual delivery by mail carriers for instance. Synthesized mail management information could be reported locally in a display device and/or remotely through a communication network, for example.

Addresses are one example of mail management information. Other types of mail management information might also or instead be synthesized. Mail management synthesis modules implemented in a mail handling system could include an address synthesis module, one or more synthesis modules that synthesize different types of mail management information, or both an address synthesis module and one or more other types of synthesis modules. Multiple synthesis modules could effectively share the same data collection infrastructure, for example, regardless of the types of mail management information that those modules synthesize. The same collected data or subsets thereof could be distributed to or otherwise obtained by the synthesis modules.

Figure 13:
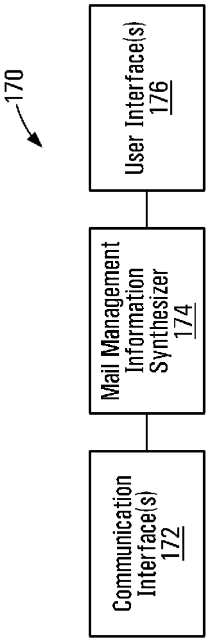
FIG. 13 is a block diagram of an example apparatus.

FIG. 13 is a block diagram of an example mail management information synthesis apparatus 170, which includes one or more communication interfaces 172, a mail management information synthesizer 174, and one or more user interfaces 176. The mail management information synthesizer 174 is operatively coupled to the communication interface(s) 172 and to the user interface(s) 176, as shown. A system in which or in conjunction with which the example apparatus 170 is implemented might include additional components which have not been explicitly shown in order to avoid overly complicating the drawing. For instance, mail management synthesis might involve collection of input data, and components for collecting such data could be provided in some embodiments. The example apparatus 170, however, illustrates an embodiment in which the input data are received through a communication interface 172.

The communication interface(s) 172 and the user interface(s) 176 could be similar in structure to the interfaces 146, 149 shown in FIG. 11. In general, a communication interface 172 would include components which support communications over one or more communication links, and a user interface 176 could include such input/output devices as a keyboard, a mouse, and a display, for example, for receiving inputs from and/or providing outputs to a user.

Hardware, firmware, one or more components which execute software, or some combination thereof might be used in implementing the interfaces 172, 176. These implementation options also apply to the mail management information synthesizer 174.

The components of the example system 170 are defined by their functions rather than particular internal structures. The present disclosure would enable a skilled person to implement these components in any of various ways to perform their respective functions.

In operation, the mail management information synthesizer 174 receives, through one or possibly more than one of the communication interfaces 172, input data including one or more of data associated with physical mail items and mail management information synthesized by a further mail management information synthesizer. The input data might be received through multiple communication interfaces 172 when there are multiple sources of such information. For example, the mail management information synthesizer 174 could potentially receive data from multiple installations of sort equipment, or receive collected data from one set of sources and synthesized addresses from another set of sources. Shipping statements are illustrative of data that might be associated with physical mail items but not necessarily collected from those mail items. Shipping statement data could be manually entered in a mail handling system and received by the mail management information synthesizer through a communication interface 172. Data from electronic shipping statements could similarly be received at the apparatus 170, although manual entry of shipping statement data would not be needed in this case. Embodiments of the invention are in no way limited to receiving input data for mail management information synthesis from any particular source or set(s) of sources.

The mail management information synthesizer 174 synthesizes mail management information from the received input data, to thereby characterize traffic that includes the physical mail items with which the collected data are associated. An indication of the synthesized mail management information is provided by the mail management information synthesizer 174 through a user interface 176 in one embodiment. The synthesis of mail management information might include, for example, one or more of: establishing volumetric distributions of the traffic, establishing geographic distributions of the traffic, mapping traffic distributions to network resources, determining traffic process flow time for a mail network, and determining a mail network for providing a given source flow time.

Providing an indication of synthesized mail management information through a user interface 176 might be useful to provide mail system management personnel with up to date information regarding network loading, current and/or predicted bottlenecks, and possibly even suggested routing/sort plan changes, for example. Management personnel can then make an informed decision as to changes that might better distribute load and improve efficiency. Synthesized mail management information could also or instead be reported to one or more remote locations through a communication interface 172.

The received input data might include data collected at different points in a mail system, illustratively at scan points at a mail piece level and at a bulk level, for example. Synthesis of the mail management information might then also involve tracking and monitoring mail transaction flow times between the scan points at the piece level and at the bulk level.

Other functions are also contemplated. The mail management information synthesis might include, for instance determining sender names and return addresses from the received input data. This would enable the mail management information synthesizer 174 to perform one or more of: alerting senders of physical mail items having undeliverable addresses, notifying addressees of the physical mail items ahead of delivery, enabling interactive scheduling with the addressees for delivery of the physical mail items, and providing an indication that physical mail items are to be intercepted for new delivery scheduling. These functions may involve interactions with remote systems and/or local users through the interfaces 172, 176.

The mail management information synthesizer 174 might implement one or more of: service delivery compliance management, network proficiency management, delivery route proficiency management, customer compliance management, a visibility service, address cleansing, delivery notification, addressee verification, synthesis of statistical relationships, and synthesis of behavioural patterns.

Figure 14:
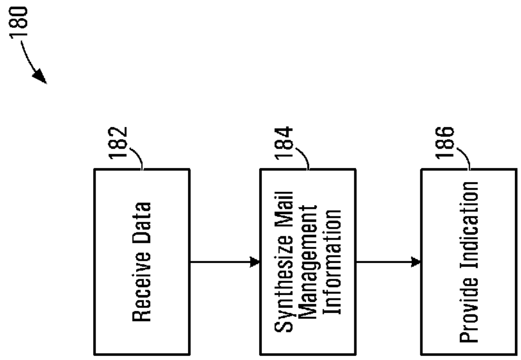
FIG. 14 is a flow diagram of another example method.

FIG. 14 is a flow diagram of an example of a related method. The example method 180 involves an operation 182 of receiving input data. The input data includes one or more of data associated with physical mail items and mail management information synthesized from the data associated with the physical mail items. The method also includes an operation 184 of synthesizing additional mail management information from the received input data to characterize traffic that includes the physical mail items, and an operation 186 of providing an indication of the synthesized additional mail management information.

Variations of the example method 180 may be or become apparent to those skilled in the art.

Embodiments of the present invention may be used to provide new systems and techniques, enabled by special intelligence in a computing network system, for artificially synthesizing mail management information such as delivery addresses from rudimentary data that are empirically observed in mail processing equipment. In the case of address synthesis, every address is defined in situ by addresses on live mail as observed. Each synthesized address carries at least one life-long confidence or probability measure that monitors its validity in the real world at any given time. An address can be considered valid and useable if its confidence or probability measure exceeds one or more thresholds, which may vary depending on the entity, application, or service intending to make use of that address.

An address in the synthesis process includes of a series of addressing attributes as observed. These attributes are pair-wise linked in a tree-like hierarchy in some embodiments. A link is an associative relationship between two attributes. The strength of this pair-wise relationship is measurable by repetitive observations. The longest linear path of all the links on the path represents an address at a certain point in time. Link strengths are calculated and monitored, and they provide the component measures to calculate path strengths for addresses. The path strength is one form of a measure of confidence or probability that an address is valid. All of the confidences or probabilities are monitored and adjusted continuously by renewed observations and/or lack of observations.

A computing system according to an embodiment of the invention may include a repository of synthesized addresses which interfaces with a synthesis apparatus or system to add newly synthesized addresses, downgrade or upgrade the confidences or probabilities of existing addresses, remove obsolete addresses, and/or retire addresses with confidences or probabilities below thresholds. In one embodiment, millions of mailing addresses could be observed in a national mail system every day, and observed data are made available to the computing system in near real-time. Updates can be daily, by production shift, or potentially on any schedule as required or desired by a postal authority or other delivery service provider, or its customer(s), for example.

An automated computing network may capture mailing addresses from mail processing equipment in plants across an entire area serviced by a postal authority or other deliver service provider, for instance, and securely extract, consolidate, and forward the captured data to such a computing system.

As mailing addresses are captured, innovative characterization of mail traffic is also possible. Some embodiments provide a new data mapping method, technique, and computing system that permit quantitative in situ characterization of mail traffic and geographic density distribution from induction origins to delivery destinations, with control of mail processing to optimize efficiencies and delivery times.

Other synthesis applications or services are also contemplated.

What has been described is merely illustrative of the application of principles of embodiments of the invention. Other arrangements and methods can be implemented by those skilled in the art without departing from the scope of the present invention.

For example, the divisions of functions or information shown in FIGS. 3, 4, 11, and 13 are illustrative of embodiments of the invention. Further, fewer, or different elements may be used to implement the techniques disclosed herein. Mail record pre-processing, address synthesis, and a synthesized address directory could potentially be provided a single physical system such as one computing device, for instance.

In addition, although described primarily in the context of methods and apparatus or systems, other implementations of the invention are also contemplated, as instructions which are stored on a computer-readable medium and when executed cause a processing element to perform certain operations, for example.

We claim:

1. An apparatus comprising:

a data collector that collects data from physical mail items; and an address synthesizer, operatively coupled to the data collector, that receives the data collected by the data collector, synthesizes addresses from the collected data, and generates confidence information from the collected data, the confidence information indicating a measure of confidence that each synthesized address is a valid address, wherein the address synthesizer further performs one or more of the following functions:

analyzing occurrence position and syntax association to enhance parsing of inside unit numbers and box numbers from delivery addresses in the collected data;

removing from the collected data random background noises created by one or more of random addressing errors and optical reading errors during collection of the data;

removing from the collected data systemic noises created by invalid addressing and persistent optical reading biases;

analyzing unit data structures of multi-unit buildings and supplementing erred or incomplete unit numbers in delivery addresses in the collected data;

adjusting, based on the collected data, a synthesis rate and accuracy at which the addresses are synthesized;

recognizing from the collected data growth of a previously single address into multiple addresses;

recognizing from the collected data consolidation of previously multiple addresses into a single address;

establishing from the collected data one or more of: volumetric mail patterns, sender mail traffic profiles, receiver mail traffic profiles, seasonal mail traffic patterns, and geographic mail traffic patterns;

recognizing from the collected data addresses in different languages and establishing equivalency for the same addresses in the different languages;

recognizing different equivalent city names in the collected data;

recognizing different interchangeable street names in the collected data;

differentiating business names and personal names associated with delivery addresses in the collected data;

differentiating last names from first and middle names in personal names associated with delivery addresses in the collected data;

establishing a most probable correct business name for a synthesized address from a set of variations in the collected data;

establishing most probable correct personal names for a synthesized address from a set of variations in the collected data.

2. The apparatus of claim 1, wherein the synthesized addresses comprise respective addressee names, and wherein the confidence information indicates a measure of confidence that each synthesized address including an addressee name is a valid address.

3. The apparatus of claim 1, further comprising:

an interface, operatively coupled to the data collector, that enables communications with remote equipment, the remote equipment capturing the data from the physical mail items, wherein the data collector collects the data by receiving the data from the remote equipment through the interface.

4. The apparatus of claim 1, further comprising:

a parser, operatively coupled to the data collector, that parses the data from raw mail records that include data captured from the physical mail items, wherein the data collector collects the data by receiving the parsed data from the parser.

5. The apparatus of claim 1, wherein the address synthesizer synthesizes the addresses by building a representation of each address comprising address attributes in a hierarchical structure, the hierarchical structure delineating relationships between the address attributes.

6. The apparatus of claim 5, wherein the confidence information comprises link strengths indicating associative strengths of pair-wise relationships between the address attributes in adjacent levels of the hierarchical structure, a combination of link strengths of links between a set of address attributes in a synthesized address providing the measure of confidence that the synthesized address is a valid address.

7. The apparatus of claim 6, wherein the address synthesizer updates the link strengths based on the link strengths following a previous collection of data, a time lapse since the previous collection, and any new occurrences of address attributes in subsequently collected data.

8. The apparatus of claim 7, wherein the address synthesizer further retires a previously synthesized address or an address attribute associated with the address where the address attribute does not occur in subsequently collected data.

9. The apparatus of claim 6, wherein the address attributes comprise addressee names, and wherein the link strengths comprise respective measures of confidence of validity of the addressee names associated with the synthesized addresses.

10. The apparatus of claim 1, wherein the data collector collects the data by receiving the data from mail sort equipment which captures the data as written on the physical mail items, and wherein the address synthesizer controls the mail sort equipment by subsequently providing the synthesized addresses to the mail sort equipment, the mail sort equipment sorting subsequently received mail items using the synthesized addresses to support correct machine interpretation of delivery addresses on the subsequently received physical mail items.

11. The apparatus of claim 1, further comprising:

a memory, operatively coupled to the address synthesizer, for storing the synthesized addresses and their associated confidence information.

12. The apparatus of claim 1, further comprising:

an interface, operatively coupled to the data collector and to the address synthesizer, that enables access to one or more of the collected data, the synthesized addresses, and the confidence information.

13. An apparatus comprising:

a data collector that collects data from physical mail items;

an address synthesizer, operatively coupled to the data collector, that receives the data collected by the data collector, synthesizes addresses from the collected data, and generates confidence information from the collected data, the confidence information indicating a measure of confidence that each synthesized address is a valid address; and a pre-processor operatively coupled to the data collector, the pre-processor receiving raw mail records including data captured from the physical mail items and providing pre-processed data from the raw mail records to the data collector as the data, the pre-processor comprising one or more of:

a record screening module that eliminates duplicate or spoiled raw mail records;

a parser that parses the data from the raw mail records; and a record segregation module that segregates raw mail records that include urban delivery addressing data and raw mail records that include rural addressing data.

14. A mail handling system comprising:

mail sort equipment that captures data from physical mail items;

the apparatus of claim 1, wherein the data collector collects the data by receiving the data from the mail sort equipment.

15. The mail handling system of claim 14, further comprising:

a synthesized address repository that receives the synthesized addresses and the associated confidence information from the address synthesizer, the synthesized address repository comprising:

a memory for storing the synthesized delivery addresses and the associated confidence information; and a user interface, operatively coupled to the memory, that enables selection of addresses and confidence levels from the synthesized addresses stored in the memory for output.

16. The mail handling system of claim 15, wherein the synthesized address repository further comprises a communication interface, operatively coupled to the memory, that enables the synthesized addresses to be transmitted to the mail sort equipment, and wherein the mail sort equipment uses the synthesized addresses to perform one or more of: sorting subsequently received mail items, verifying delivery addresses in subsequently received mail items, correcting delivery addresses in subsequently received mail items, and redirecting subsequently received incorrectly addressed mail items to correct addresses.

17. The mail handling system of claim 14, wherein the data collector and the address synthesizer comprise a first synthesis module, the mail handling system further comprising:

a second synthesis module that receives input data comprising one or more of the collected data, the synthesized addresses, and the confidence information, and synthesizes mail management information from the received input data.

18. The mail handling system of claim 17, wherein the synthesized mail management information characterizes traffic comprising the physical mail items.

19. The mail handling system of claim 18, wherein the second synthesis module further comprises a user interface that provides an indication of the synthesized mail management information.

20. The mail handling system of claim 18, wherein the second synthesis module synthesizes the mail management information by one or more of: establishing volumetric distributions of the traffic, establishing geographic distributions of the traffic, mapping traffic distributions to network resources, determining traffic process flow time for a mail network, and determining a mail network for providing a given service flow time.

21. A method comprising:

collecting data from physical mail items;

synthesizing addresses from the collected data; and generating confidence information from the collected data, the confidence information indicating a measure of confidence that each synthesized address is a valid address, wherein synthesizing comprises one or more of:

analyzing occurrence position and syntax association to enhance parsing of inside unit numbers and box numbers from delivery addresses in the collected data;

removing from the collected data random background noises created by one or more of random addressing errors and optical reading errors during collection of the data;

removing from the collected data systemic noises created by invalid addressing and persistent optical reading biases;

analyzing unit data structures of multi-unit buildings and supplementing erred or incomplete unit numbers in delivery addresses in the collected data;

adjusting, based on the collected data, a synthesis rate and accuracy at which the addresses are synthesized;

recognizing from the collected data growth of a previously single address into multiple addresses;

recognizing from the collected data consolidation of previously multiple addresses into a single address;

establishing from the collected data one or more of: volumetric mail patterns, sender mail traffic profiles, receiver mail traffic profiles, seasonal mail traffic patterns, and geographic mail traffic patterns;

recognizing from the collected data addresses in different languages and establishing equivalency for the same addresses in the different languages;

recognizing different equivalent city names in the collected data;

recognizing different interchangeable street names in the collected data;

differentiating business names and personal names associated with delivery addresses in the collected data;

differentiating last names from first and middle names in personal names associated with delivery addresses in the collected data;

establishing a most probable correct business name for a synthesized address from a set of variations in the collected data;

establishing most probable correct personal names for a synthesized address from a set of variations in the collected data.

22. The method of claim 21, wherein the synthesized addresses comprise respective addressee names, and wherein the confidence information indicates a measure of confidence that each synthesized address including an addressee name is a valid address.

23. The method of claim 21, wherein collecting comprises one or more of:

capturing the data from the physical mail items and receiving data that is captured from the physical mail items.

24. The method of claim 21, further comprising:

parsing the data from raw mail records that include data captured from the physical mail items, wherein collecting comprises receiving the parsed data.

25. The method of claim 21, wherein synthesizing comprises building a representation of each address comprising address attributes in a hierarchical structure, the hierarchical structure delineating relationships between the address attributes.

26. The method of claim 25, wherein the confidence information comprises link strengths indicating associative strengths of pair-wise relationships between the address attributes in adjacent levels of the hierarchical structure, a combination of link strengths of links between a set of address attributes in a synthesized address providing the measure of confidence that the synthesized address is a valid address.

27. The method of claim 26, further comprising:

updating the link strengths based on the link strengths following a previous collection of data, a time lapse since the previous collection, and any new occurrences of address attributes in subsequently collected data.

28. The method of claim 27, further comprising:

retiring a previously synthesized address or an address attribute associated with the address where the address attribute does not occur in subsequently collected data.

29. The method of claim 26, wherein the address attributes comprise addressee names, and wherein the link strengths comprise respective measures of confidence of validity of the addressee names associated with the synthesized addresses.

30. The method of claim 21, wherein collecting comprises receiving the data from mail sort equipment which captures the data from the physical mail items, the method further comprising:

controlling the mail sort equipment by subsequently providing the synthesized addresses to the mail sort equipment, the mail sort equipment sorting subsequently received mail items using the synthesized addresses to support correct machine interpretation of delivery addresses on the subsequently received physical mail items.

31. The method of claim 21, further comprising:

providing access to one or more of the collected data, the synthesized addresses, and the confidence information.

32. A method comprising:

collecting data from physical mail items;

synthesizing addresses from the collected data;

generating confidence information from the collected data, the confidence information indicating a measure of confidence that each synthesized address is a valid address;

receiving raw mail records including data captured from the physical mail items; and pre-processing the raw mail records to provide pre-processed data from the raw mail records as the collected data, the pre-processing comprising one or more of:

eliminating duplicate or spoiled raw mail records;

parsing the data from the raw mail records; and segregating raw mail records that include urban delivery address data and raw mail records that include rural address data.

33. The method of claim 21, further comprising:

using the synthesized addresses to perform one or more of: verifying addresses in subsequently received mail items, correcting addresses in subsequently received mail items, and redirecting subsequently received incorrectly addressed mail items to correct addresses.

34. The method of claim 21, further comprising:

synthesizing mail management information from input data comprising one or more of the collected data, the synthesized addresses, and the confidence information.

35. The method of claim 34, wherein the synthesized mail management information characterizes traffic comprising the physical mail items.

36. The method of claim 35, further comprising:

providing an indication of the synthesized mail management information.

37. The method of claim 35, wherein synthesizing the mail management information comprises one or more of: establishing volumetric distributions of the traffic, establishing geographic distributions of the traffic, mapping traffic distributions to network resources, determining traffic process flow time for a mail network, and determining a mail network for providing a given service flow time.

* * * * *